(12) United States Patent
Ebisawa et al.

(10) Patent No.: US 6,414,713 B1
(45) Date of Patent: Jul. 2, 2002

(54) COMMODITY IMAGE DATA PROCESSORS, RECORDING MEDIUMS WHICH CONTAIN A COMMODITY IMAGE DATA PROCESSING PROGRAM, AND IMAGE PICKUP AIDING APPARATUS

(75) Inventors: Isao Ebisawa; Seiji Tachibana, both of Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 09/218,592

(22) Filed: Dec. 22, 1998

(30) Foreign Application Priority Data

Dec. 25, 1997 (JP) .............................................. 9-358413
Dec. 29, 1997 (JP) .............................................. 9-369070

(51) Int. Cl.⁷ ................................................ H04N 7/18
(52) U.S. Cl. ........................................ 348/131; 348/86
(58) Field of Search ................................ 348/131, 141; 248/429; 382/110, 150; 235/462.14; 356/402, 504; 209/556; 600/558; 378/98.2

(56) References Cited

U.S. PATENT DOCUMENTS

| | | | | |
|---|---|---|---|---|
| 3,782,364 A | * | 1/1974 | Watt | 600/558 |
| 4,729,536 A | * | 3/1988 | Scala | 248/429 |
| 4,809,308 A | * | 2/1989 | Adams et al. | 378/98.2 |
| 5,058,178 A | * | 10/1991 | Ray | 382/150 |
| 5,152,401 A | * | 10/1992 | Affedlt, Jr. et al. | 209/556 |
| 5,355,217 A | * | 10/1994 | Canteloup et al. | 356/504 |
| 5,488,479 A | * | 1/1996 | Williams et al. | 356/402 |
| 5,770,848 A | * | 6/1998 | Oizumi et al. | 235/462.14 |

FOREIGN PATENT DOCUMENTS

| JP | 08-227480 | 9/1996 |
|---|---|---|
| JP | 09-204478 | 8/1997 |

* cited by examiner

*Primary Examiner*—Chris Kelley
*Assistant Examiner*—Allen Wong
(74) *Attorney, Agent, or Firm*—Frishauf, Holtz, Goodman & Chick, P.C.

(57) ABSTRACT

An image pickup system is provided wherein an illumining device illumines an object from above on its front side. When an image of the object is to be picked up, a moving device moves the position of the image pickup device relative to the object so as to easily pickup the image of the object. To this end, a commodity as an object is placed within an image pickup box. An image of the commodity is picked up by a camera placed outside the box. In this case, the commodity is illumined by the illumining device from above on its front side. The camera and the commodity are moved relative to each other. Thus, illumination blurs are reduced and a clear image is easily picked up.

9 Claims, 33 Drawing Sheets

| JAN CODE | FRONT IMAGE | SIDE IMAGE | TOP IMAGE | WEIGHT | SIZE | OTHER SET DATA |
|---|---|---|---|---|---|---|
|  |  |  |  |  |  |  |
|  |  |  |  |  |  |  |

COMMODITY FILE 41-1

FIG.23

PHOTO CLASSIFICATION CODE DATA MEMORY 41-5

| CODE No. | CONTAINER | | | | CONTENTS | |
|---|---|---|---|---|---|---|
| | MATERIAL | HUE 1 | HUE 2 | | COLOR 1 | COLOR 2 |
| 0 | PAPER | TRANS-PARENT | WHITE | NONE | TRANS-PARENT | WHITE |
| 1 | GLASS | TRANS-LUCENT | YELLOW | SEMI-MIRROR FACE | TRANS-LUCENT | YELLOW |
| 2 | RESIN | WHITE | RED | MIRROR FACE | WHITE | RED |
| 3 | IRON | YELLOW | BLUE | | YELLOW | BLUE |
| 4 | VINYL | RED | GREEN | | RED | GREEN |
| 5 | PET | BLUE | BROWN | | BLUE | BROWN |
| 6 | CLOTH | GREEN | GRAY | | GREEN | GRAY |
| 7 | LEATHER | BROWN | BLACK | | BROWN | BLACK |
| 8 | ALUMINUM | GRAY | ORANGE | | GRAY | ORANGE |
| ⋮ | ⋮ | ⋮ | ⋮ | ⋮ | ⋮ | ⋮ |
| X | NONE APPLICABLE | ← | ← | ← | ← | ← |

FIG. 24

LEARNING DATA MEMORY 41-6

| SIZE W H D | PHOTO CLASS. CODE | FRONT | | | | | TOP | | | | | NTH FACE | | | | |
|---|---|---|---|---|---|---|---|---|---|---|---|---|---|---|---|---|
| | | M1 | M2 | ~ | Mn | | M1 | M2 | ~ | Mn | | M1 | M2 | ~ | Mn |
| ○○×○○○×○○ | 10××3× | X1 | Y1 | ~ | P1 | | X2 | Y2 | ~ | P2 | | Xn | Yn | ~ | Pn |

COMMODITY FILE 41-1

| COMMODITY CODE (JAN) | NAME | UNIT PRICE | SIZE W H D | WEIGHT | PHOTO CLASS. CODE | IMAGE PICKUP COMPLETE FLAG | FRONT IMAGE MEMORY No. | TOP IMAGE MEMORY No. | NTH FACE IMAGE MEMORY No. |
|---|---|---|---|---|---|---|---|---|---|
| 0 2 ··· 3 2 1 | LEMON JUICE | ¥120 | ○○×○○○×○○ | 0.4kg | 10XX30 | COMPLETE | 1 | 2 | n |
| 0 2 ··· | | | | | | UN-COMPLETE | | | |

FIG.26

IMAGE DATA MEMORY 41-7

| MEMORY No. | ACTUAL IMAGE DATA |
|---|---|
| 1 | LEMON JUICE BOTTLE FRONT IMAGE DATA |
| 2 | LEMON JUICE BOTTLE TOP IMAGE DATA |

FIG.34A
FIG.34B
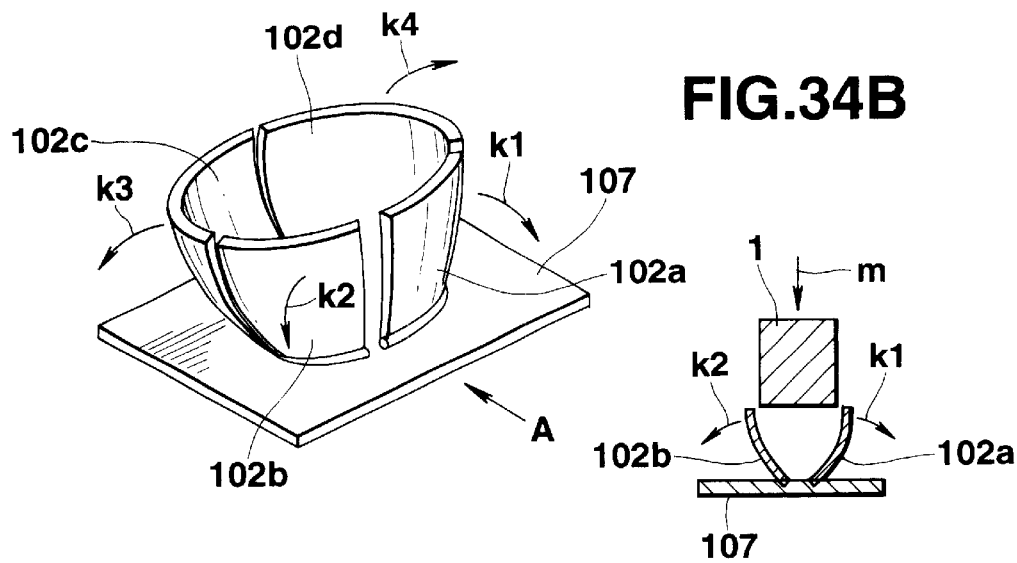
FIG.35A
FIG.35B
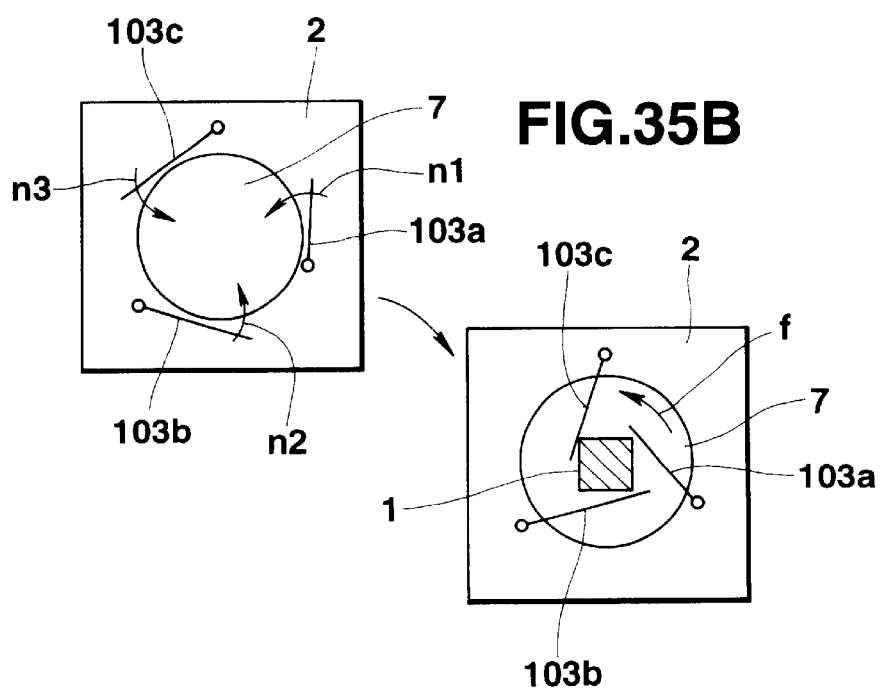

COMMODITY IMAGE DATA PROCESSORS, RECORDING MEDIUMS WHICH CONTAIN A COMMODITY IMAGE DATA PROCESSING PROGRAM, AND IMAGE PICKUP AIDING APPARATUS

BACKGROUND OF THE INVENTION

1. Technical Field

The present invention relates to commodity image data processors which pick up, store and manage an image of a commodity and recording mediums which contain a commodity image data processing program and image pickup aiding apparatus which aid in the pickup of the image of the commodity.

2. Background Art

Generally, supermarkets pick up an image of a commodity independently, and publicize the commodity by placing its image on an advertisement. Pickup of such commodity image is performed by an expert photographer within a special studio, but its cost is high. Thus, it is necessary for a store clerk to be easily able to pick up an image of a commodity. In order to satisfy such need, an image pickup aiding apparatus has been studied and developed in the past.

In the image pickup aiding apparatus of this type, a commodity is placed within the apparatus body and spotlighted from its side by an illumining device. In this state, an image of a front or top of the commodity is externally pick up by a camera.

However, the spotlight is locally strong. Thus, uneven illumination would occur on the spotlighted side of the commodity and no clear image can be obtained.

In the image pickup aiding apparatus, a camera is fixed by a tripod when the front image of a commodity is picked up. When a top image of the commodity is picked up, the photographer is required to pick up that image with a camera in his or her hand. Thus, this work is troublesome.

The present invention is intended to provide a clear picked-up image with reduced uneven illumination and to easily pick up images of at least two faces of an object as a commodity.

In a commodity managing system which manages picked-up images of objects such as commodities, management of individual commodities include creating and storing a list of commodity management data including codes, names, sizes and weights of commodities for corresponding picked-up images of the commodities.

Such commodity management data are used by a managing party as well as in advertisements, pamphlets, catalogs, etc., or by showing them to clients. Thus, the image of the commodity is required to be picked up well so that its attraction is brought out to a maximum.

Conventionally, in order to create such commodity management data, images of a commodity are picked up by a professional photographer or a person skilled in picking up the image of the commodity, various commodity information on a commodity code, name, size, weight, etc., is manually added to the picked-up image data to thereby obtain a list of those data.

However, it would take much time and labor for even a skilled person to create such commodity management data manually in a real field of commodity sales where many kinds of commodities are handled.

Especially, in a large-scaled store such as a discount store or a supermarket, it is necessary that a non-skilled person such as a part-timer produces such commodity management data. In this case, it further takes much time and labor as well as it is very difficult to pick up images of the individual commodities well like a professional or expert photographer.

It is therefore an object of the present invention to provide a commodity image data processor capable of easily creating commodity management data which includes commodity image data and information items in corresponding relationship, and a recording medium which contains a commodity image data processing program.

Another object of the present invention is to provide a commodity image data processor and program recording medium capable of easily picking up a clear image of commodity with reduced uneven illumination.

SUMMARY OF THE INVENTION

The features of the present invention are as follows: When classification data on a commodity whose image is picked up is input by input means and an image of the commodity is picked up by an image pickup device, the image data is stored and managed in correspondence to the input classification data. Thus, according to the present invention, only by repeating input of classification data on various commodities and pickup of the images of the commodities, commodity management data are easily created.

According to one aspect of the present invention, there is provided an image pickup aiding apparatus cooperative with an image pickup device to aid the image pickup device in externally picking up an image of an object placed within a body of the image pickup aiding apparatus, comprising illumining means provided on the side of a front of the body of the image pickup aiding apparatus at a position above the body of the image pickup aiding apparatus and closer to the object than the image pickup device for illumining the object on its front side from above, and moving means for moving at least one of the image pickup device and the object to move an image pickup position of said image pickup device relative to the object.

Thus, according to the present invention, the object is illumined from above on the side of its front by the illumining device positioned closer to the object than to the image pickup device. Thus, when the image of the object is picked up, a clear image is obtained with reduced uneven illumination. At least one of the image pickup device and the object is moved by the moving means, so that the image pickup position of the image pickup device relative to the object is changed. Thus, the images of at least two faces of the object are easily picked up.

BRIEF DESCRIPTION OF THE DRAWINGS

FIG. 23 illustrates the contents of data in a photo classification code data memory provided in a RAM of the controller;

FIG. 24 illustrates the contents of data in a learning data memory provided in the RAM;

FIG. 26 illustrates the contents of data in an image buffer provided in the RAM;

FIG. 34A is a perspective view of a second commodity centering mechanism of the commodity image data processor;

FIG. 34B illustrates operation of the second centering mechanism as viewed in the direction of arrow A in FIG. 34A;

FIG. 35A is a plan view of a third commodity centering mechanism of the commodity image data processor;

FIG. 35B is a plan view of the third commodity centering mechanism in its centering state;

BEST MODE FOR CARRYING OUT THE INVENTION

Refereeing to FIGS. 1–10, a first embodiment of an image pickup aiding apparatus (or commodity image data processor) according to the present invention will be described.

Figure 1:
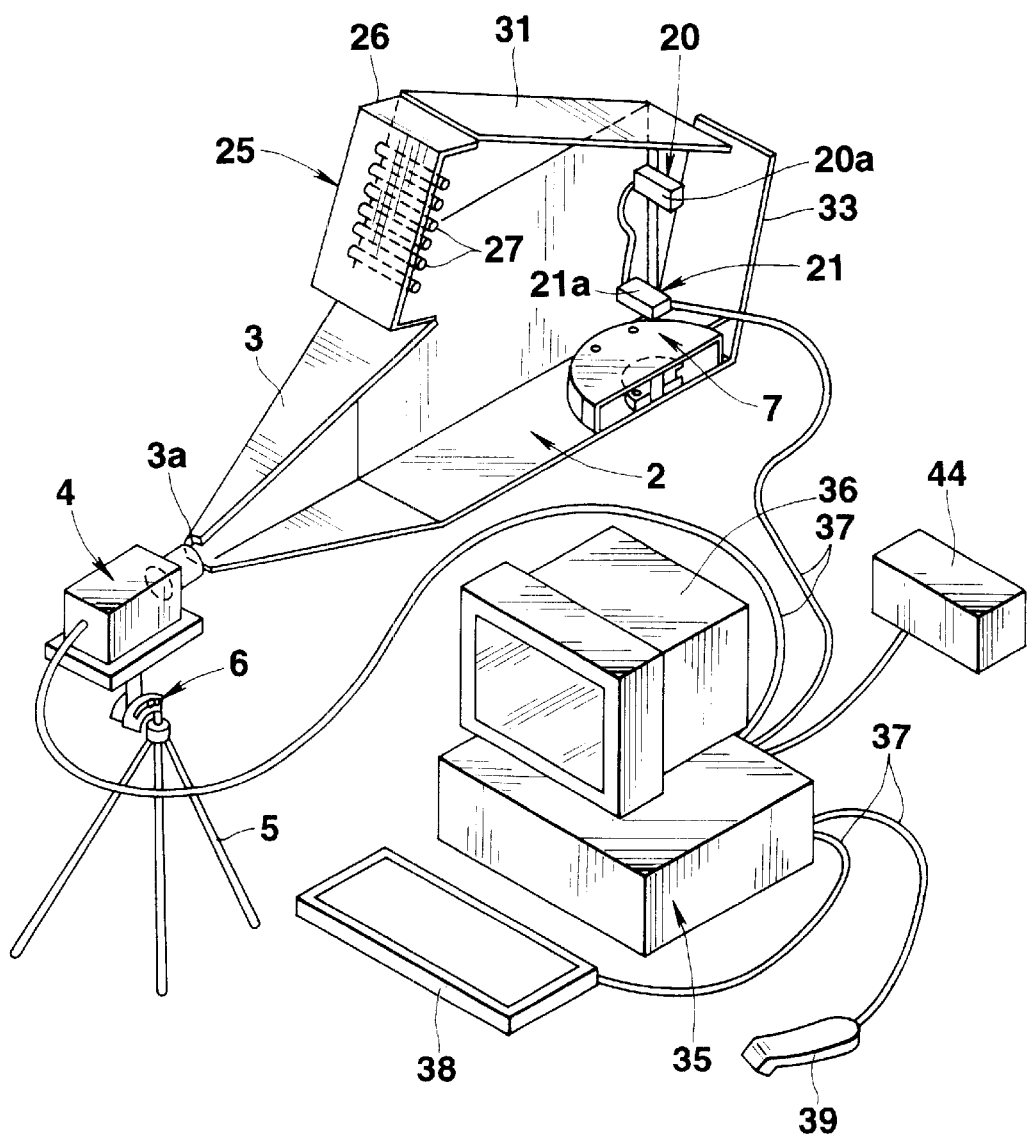
FIG. 1 illustrates a system including a first embodiment of an image pickup aiding apparatus with its several parts being omitted for illustrating purposes.
Figure 2:
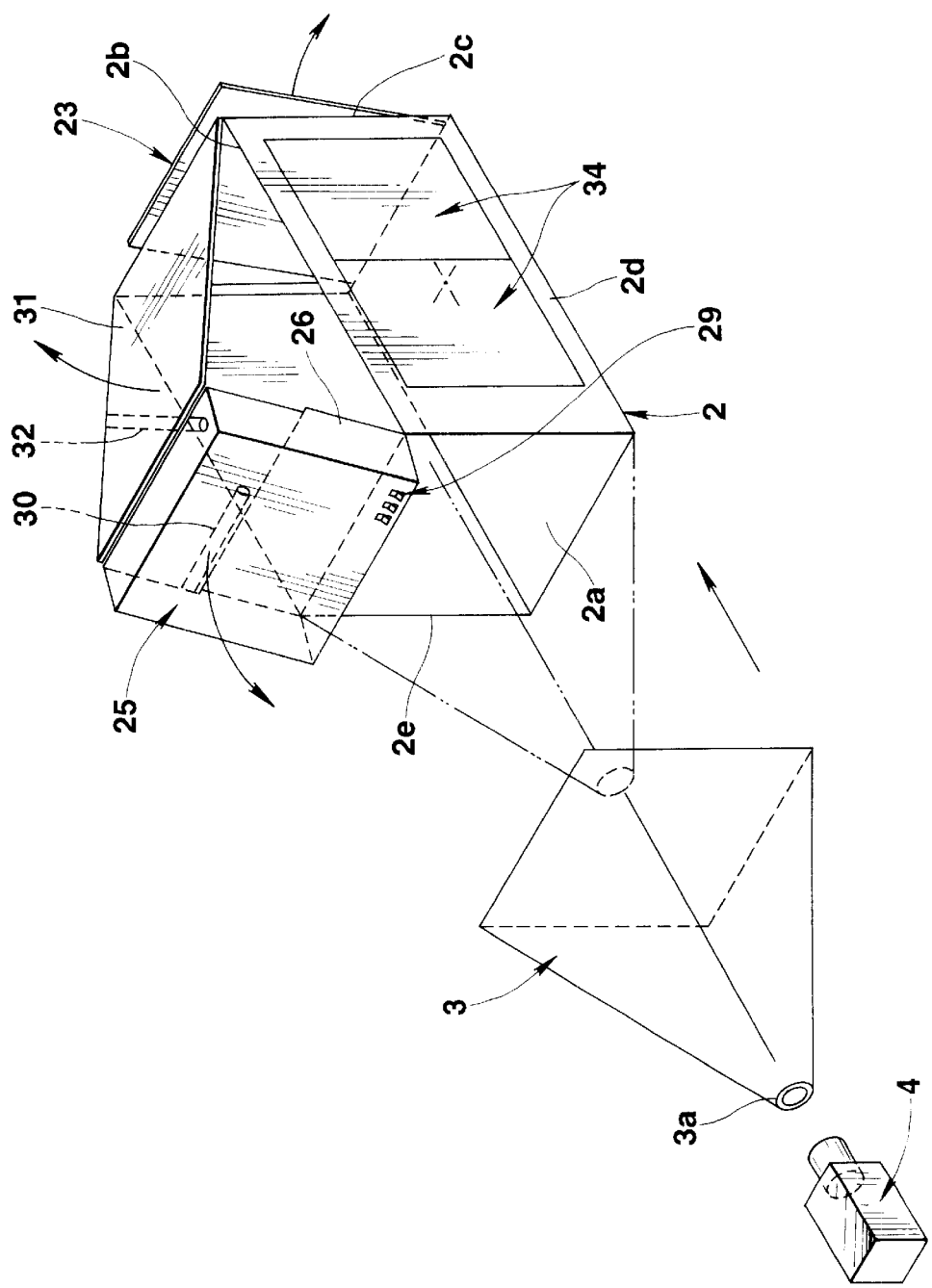
FIG. 2 is an exploded perspective view of a part of the image pickup aiding apparatus.

FIG. 1 illustrates a system including a first embodiment of an image pickup aiding apparatus with its several parts being omitted for illustrating purposes. FIG. 2 is an exploded perspective view of apart of the image pickup aiding apparatus.

Figure 3:
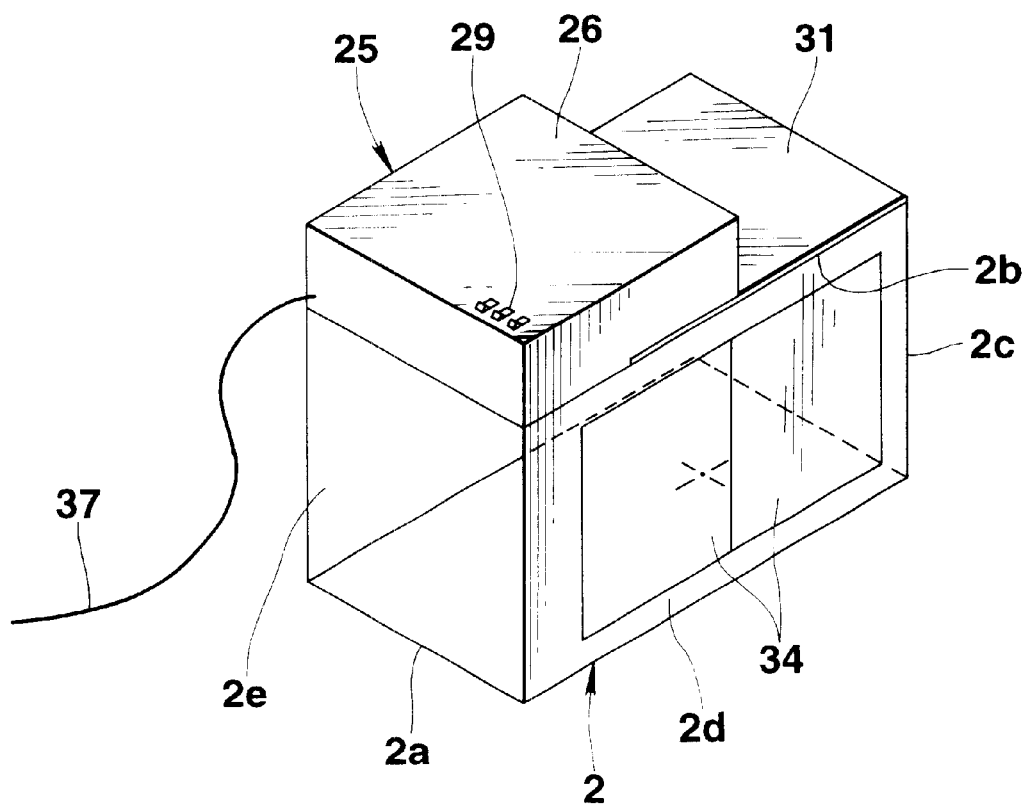
FIG. 3 is a perspective view of a partially folded image pickup aiding apparatus.
Figure 4:
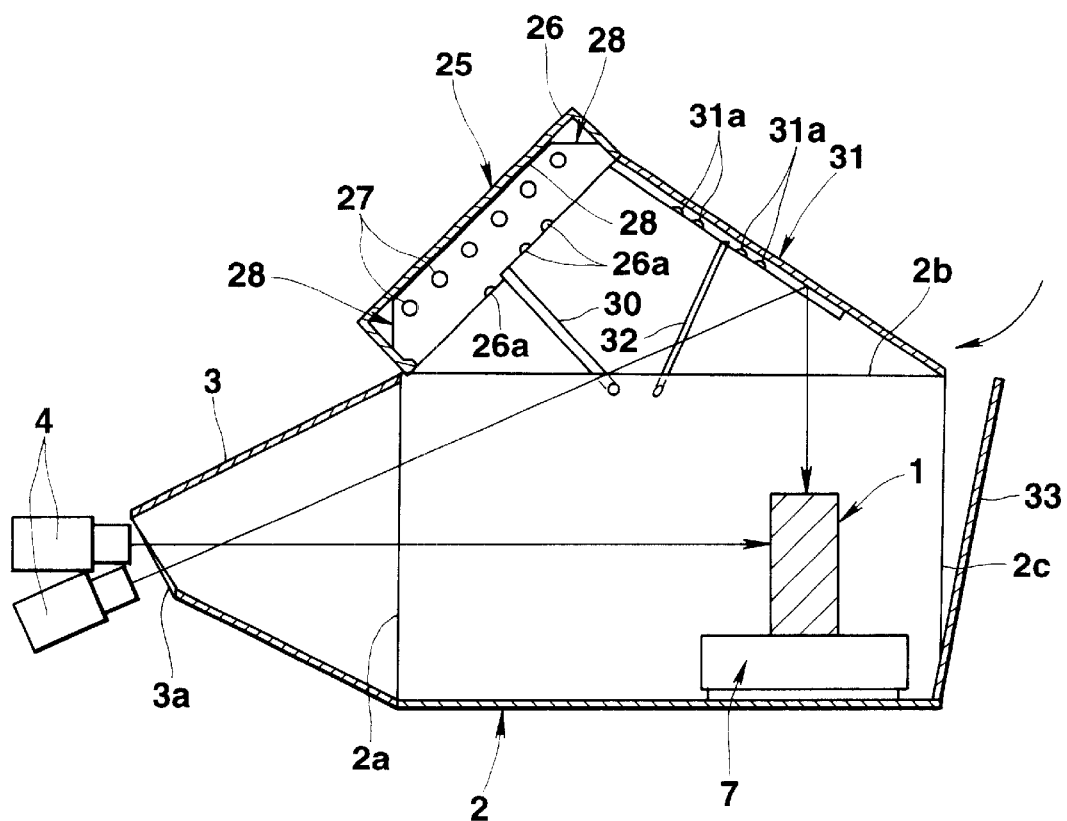
FIG. 4 is a diagrammatically cross-sectional view of the image pickup aiding apparatus of FIG. 1 placed in an image pickup aiding state.

FIG. 3 is a perspective view of a partially folded image pickup aiding apparatus. FIG. 4 is a diagrammatically cross-sectional view of the image pickup aiding apparatus of FIG. 1 placed in an image pickup aiding state.

The image pickup aiding apparatus shown is used to pickup an image of a commodity 1 (FIG. 4) as an object. It includes a housing box or body 2 in which the commodity 1 is to be disposed. The box's front 2a (left side of FIGS. 2 and 3) is open and has a camera or image pickup hood 3 attached removably thereto. The camera hood 3 takes the form of a substantially truncated pyramid with an oval truncated open end to which an image pickup camera or device 4 is disposed close. The camera 4 is a digital one which includes a CCD (photo-detector) which detects an image of the commodity 1 and outputs a corresponding electrical signal. The camera 4 is supported by a tripod 5, which includes a tilting mechanism 6 for inclining the camera 4 in a vertical plane, and has the functions of moving the camera 4 up and down, and rotating the camera in a horizontal plane.

A lens window 3a is provided inclined at a front end of the camera hood 3 so that its upper end protrudes more forward than its lower end 2 to form an oval opening (FIG. 4). Thus, a camera lens 4a is allowed to turn in a front image pickup angle and in a top image pickup angle.

Figure 5:
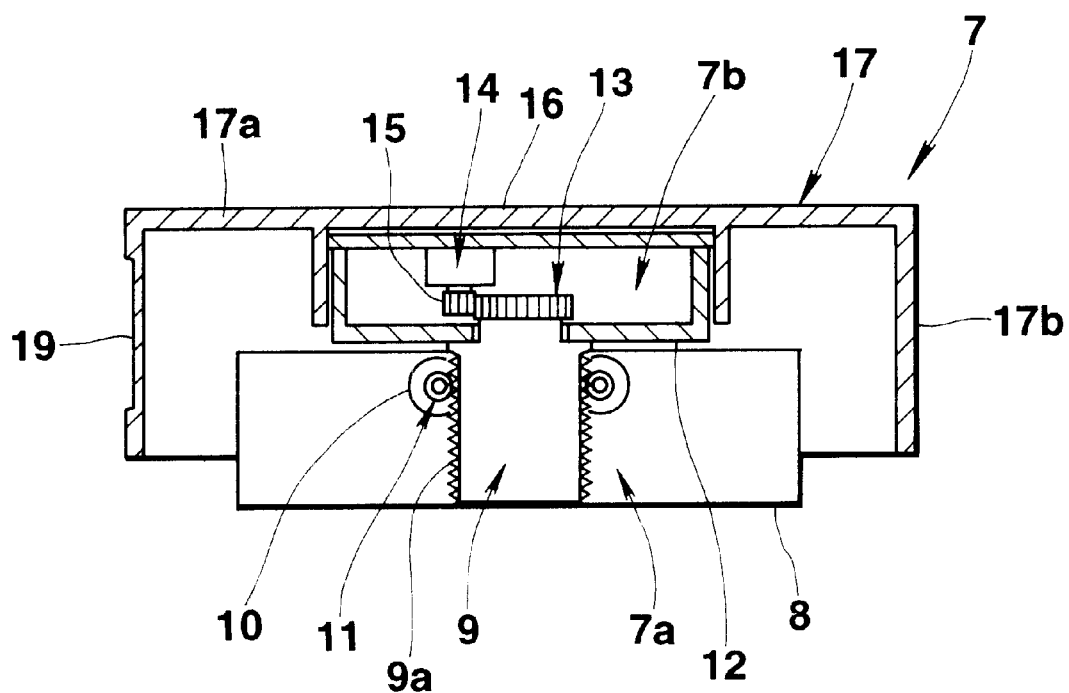
FIG. 5 is an enlarged cross-sectional view of a rotary stage of FIG. 1.

As shown in FIG. 1, a rotary stage 7 on which a commodity 1 whose image is to be picked up is placed is provided on a bottom of the box 2 at a backward position. As shown in FIG. 5, the rotary stage 7 is provided with an elevating mechanism 7a and a rotating mechanism 7b.

The elevating mechanism 7a is provided with a control case 8 placed on the bottom of the box 2 at a backward position. An elevating shaft 9 is provided at substantially the center of the control case 8 so as to be extendable vertically through an upper end of the control case 8. The shaft 9 has rack teeth 9a provided axially on its outer periphery. Disposed in the vicinity of the shaft 9 within the control case 8 is an elevating motor 10 whose output shaft has thereon a pinion 11 which meshes with rack teeth 9a of the elevating shaft 9. Thus, when the pinion 11 is rotated by the motor 10, the elevating mechanism 7a moves the shaft 9 vertically.

The rotating mechanism 7b is provided with a rotary case 12 provided rotatably at an upper end of the elevating shaft 9 which extends upward through the control case 8 so as to move vertically along with the shaft 9. The rotary case 12 is provided therein with a gear 13 fixed at an upper end of the shaft 9, and a rotational motor 14. In this rotating mechanism 7b, the pinion 15 provided on the output shaft of the motor 14 meshes with the gear 13 so that when the pinion 15 is rotated by the motor 14 to roll along the outer periphery of the gear 13, the case 12 is rotated around the shaft 9.

Provided on the rotary case 12 is a piezoelectric sensor 16 which measures the weight of the commodity 1. A base 17 is provided through the piezoelectric sensor 16 to the rotary case 12. The base 17 has a disc top 17a larger in outer diameter than the control case 8 and a hollow cylindrical side wall 17b so that when the elevating shaft 9 lowers to its lowest position, the lower end of the side wall 17b is positioned somewhat above the bottom of the box 2. In this case, the base 17 is sized so that any one of commodities ranging from a small commodity such as a small screw to a larger commodity such as a dog food can be placed on it. Thus, the box 2 is sized large enough to receive a large commodity 1 such as the dog food, and the piezoelectric sensor 16 is such that it can measure the weight of any of commodities ranging from a screw of several grams to a dog hood of several kilograms.

Figure 6A:
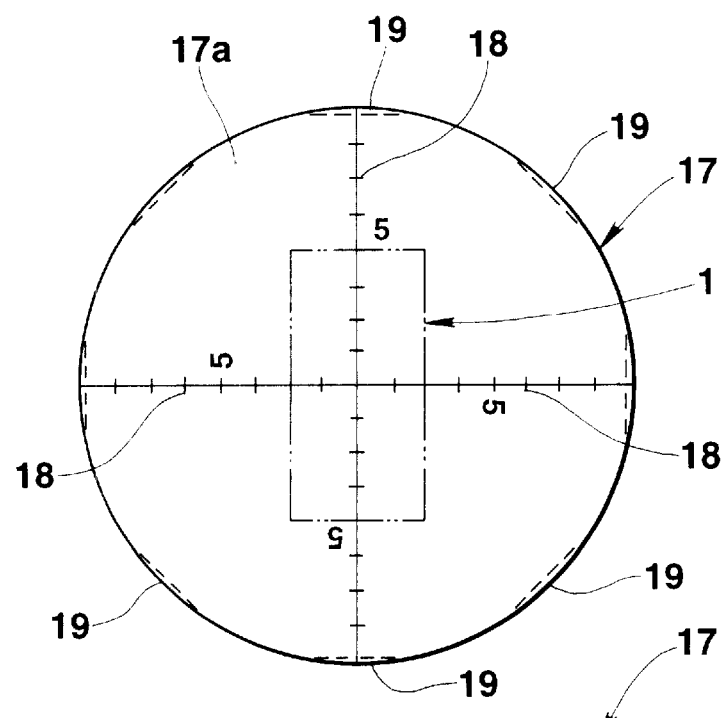
FIG. 6A is a plan view of a base of the rotary stage of FIG. 5.
Figure 6B:
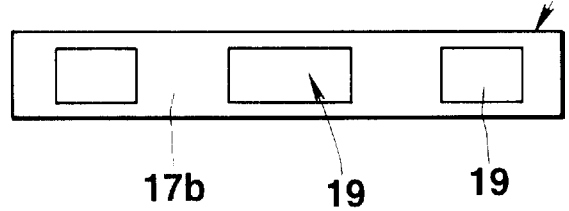
FIG. 6B is a side view of the base.

As shown in FIG. 6A, the upper surface of the disc top 17a has a cross scale 18 to express a X-Y coordinate system which represents the position and size of the commodity. As shown in FIG. 6B, white adjustment marks 19 are provided at equal intervals on the outer periphery of the base side wall 17b to adjust the chromaticity of the camera 4, for example, when external light other than that from the illuminating device 25 is irradiated on the commodity 1 in the image pickup of the commodity 1. Provided within the control case 8 is a control unit (not shown) which drives the elevating motor 10 in accordance with a control command from a controller (personal computer) 35. Also, provided within the rotary case 12 is another control unit (not shown) which drives the rotary motor 14 in accordance with a control command from the controller 35 and outputs to the controller 35 data on the weight of the commodity 1 sensed by the piezoelectric sensor 16.

As shown in FIG. 1, a front display unit 20 and a top display unit 21 are provided in the vicinity of the rotary stage 7 to display information on the number of picked-up images, weight and size of the commodity 1. Those display units are composed of a liquid crystal display or a fluorescent display tube disposed so that the camera 4 can pickup the displayed information. To this end, as shown in FIG. 1, the front display unit 20 is disposed so that its display screen 20a faces the camera 4 at a backward upper position within the box 2. The top display 21 is disposed at a backward lower position within the box 2 so that its display face faces upward and hence light from the display face 21a is reflected through a mirror plate 31 toward the camera 4.

As shown in FIGS. 1 and 2, the top 2b of the box 2 is open. An illumining device 25 is provided so as to turn in a vertical plane on top of the front 2a of the box 2 to illumine the commodity 1 placed on the rotary stage 7 from above on the side of a front of the box 2. As shown in FIG. 4, the illumining device 25 has a plurality of fluorescent tubes 27 arranged in a plane within an illumining box 26 so that light from the respective fluorescent tubes 27 and light reflected by a reflective sheet 28 provided on the internal surface of the illumining box 26 is diffused so as to form an even plane-emission light source to illumine the commodity 1 placed on the rotary stage 7 from its front upper position. In this case, as shown in FIGS. 2 and 3, illumination adjustment switches 29 is provided on the outside of the illumining box 26 to adjust the illumination by selecting the lighted fluorescent tubes 27. As shown in FIG. 4, a support arm 30 is provided turnably at one end on an upper portion of a rear side 2e of the box 2 and engaged at the other end in any one of a plurality of engaging recesses 26a provided on the side of the box 26 so that the illumining box 26 is supported at a predetermined angle over the box 2.

As shown in FIG. 4, the mirror (reflective) plate 31 which reflects the top image of the commodity 1 placed on the rotary stage 7 toward the camera 4 on the side of the camera hood 3 is provided turnably in the vertical plane on top of the back 2c of the box 2. A support arm 32 provided attached turnably at one end on top of the back side 2e of the box 2 is engaged at the other end in any one of a plurality of engaging recesses 31a provided on the side of the mirror plate 31 to support the mirror plate 31 at a predetermined angle over the box 2.

As shown in FIG. 3, by releasing the engagement of the support arms 30 and 32 with the engaging recesses 26a and 31a, the illumining device 25 and the mirror plate 3 are turned and disposed on the top surface 2b of the box 2 with the mirror plate 31 overlapping with the illumining device 25 to thereby be folded on the box 2.

A back plate 33 which closes the back 2c of the box 2 is provided at a lower position on the back 2c so that the back plate 33 can turn toward the back of the box 2. When the back plate 33 opens at a predetermined angle to the back of the box 2, external light is allowed to be introduced into the box 2 to illumine the back of the commodity 1. A scale (not shown) which represents the height and width of the commodity 1 is provided on the back plate 33. A pair of slidable door 34 are provided on this side 2d of the box 2 so that the doors can slide in different tracks to form or close an opening as shown in FIGS. 2 and 3. The inside of the box 2 including the back plate 33, the camera hood 3 and the sliding doors 34 are coated with a white color.

As shown in FIG. 1, the controller 35 is disposed outside the box 2. A display unit 36 such as a CRT is disposed on top of the controller 35 and electrically connected to the controller 35. The camera 4, rotary stage 7, front display unit 20, top display unit 21, illumining device 25 as well as a keyboard 38, a hand scanner 39 and a printer 44 are electrically connected by cables 37 to be controller 35.

Figure 7:
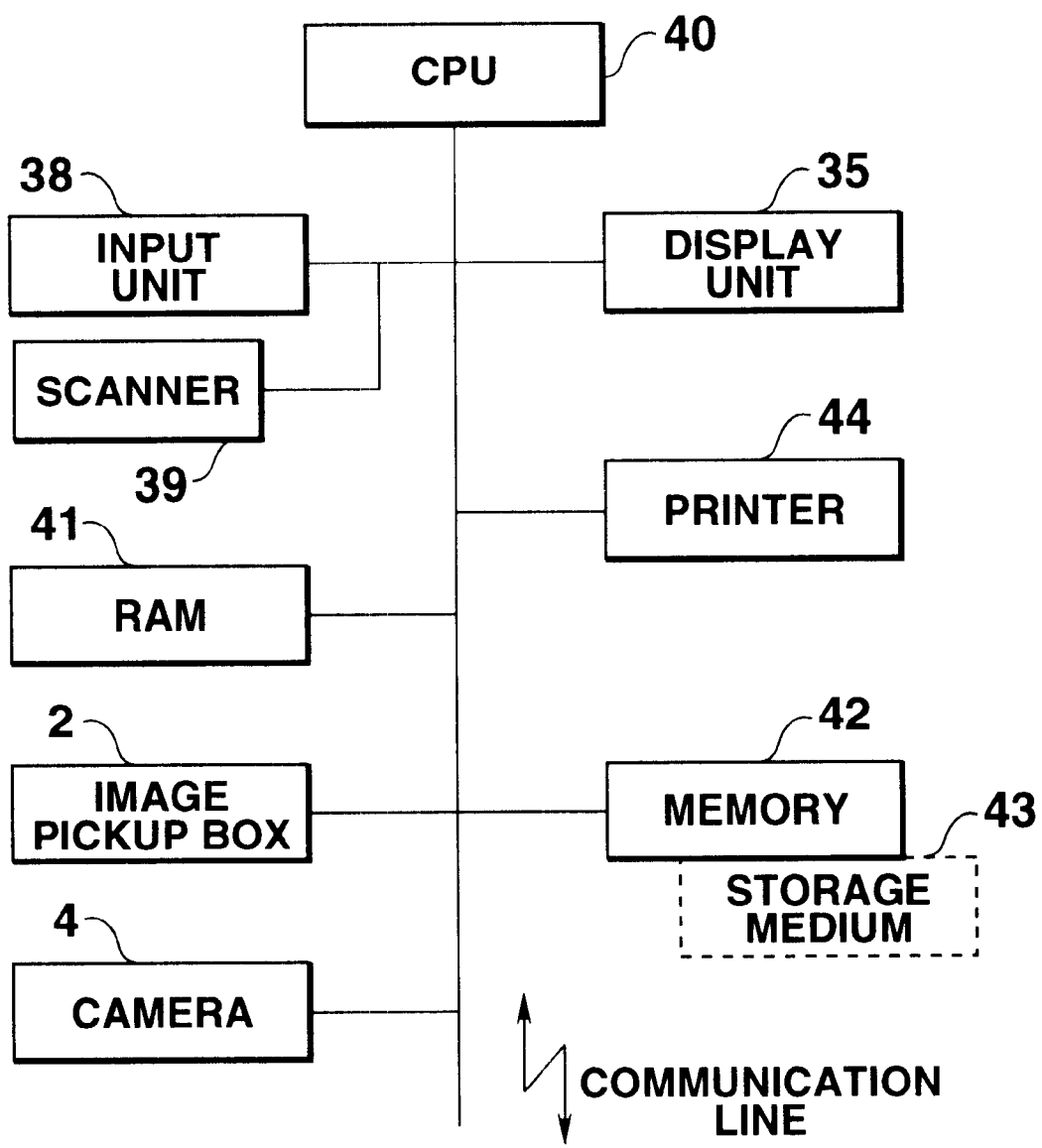
FIG. 7 is a block diagram of the image pickup aiding apparatus of FIG. 1.

Referring to FIG. 7, the circuit composition of the image pickup aiding apparatus will be described next. A CPU 40 of the controller 35 (including a computer) controls the whole system of the image pickup aiding apparatus in accordance with various programs loaded on a RAM 41. A storage device 42 includes a recording medium 43 which contains an operating system, various control programs and data files, and a drive system program for the storage device 43. The storage device 43 is composed of a magnetic/optical recording medium/semiconductor memory such as a hard disc, a floppy disc, an optical disc and/or a RAM card, provided fixedly or removably. Programs/data stored in the recording medium 43 are loaded on the RAM 41 under control of CPU 40 as requested. The CPU 40 can receive programs/data from other devices via communication lines, store them in the recording medium 43 and use programs/data stored in a recording medium provided in another device via a communication line.

The CPU 40 is connected electrically to the keyboard 38, hand scanner 39, display unit 36, camera 4, box 2 and printer 44 through a bus to control those elements in accordance with input/output programs.

The keyboard 38 inputs commodity data and various commands. The hand scanner 38 inputs commodity data such as a bar code which is displayed on a display screen of the display unit 36 or stored in a commodity file 41-1 (FIG. 8) of the RAM 41.

While the display unit 36 is illustrated as a CRT in this embodiment, it may be a plane display such as a liquid crystal display or a plasma display capable of providing a color image.

The respective elements within the image pickup box 2 include the rotary stage 7, front display unit 20, top display unit 2 and illumining device 25.

The printer 44 is a color printer of a non-impact type such as a heat transfer/ink jet type or of a dot impact type.

Figures 8, 9:
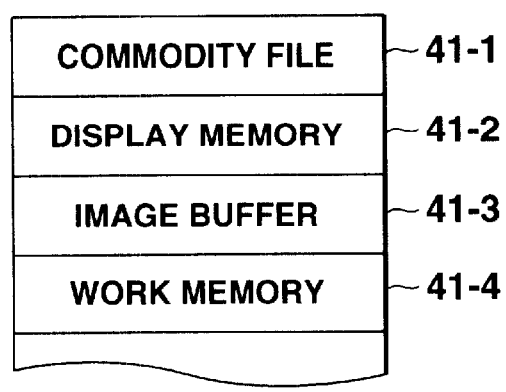
FIG. 8 illustrates a main composition of a RAM of FIG. 7.
FIG. 9 illustrates a commodity file of FIG. 8.

FIG. 8 illustrates the main composition of the RAM 41 which includes various memory areas in which the commodity file 41-1 sequentially stores various commodity data, and as shown in FIG. 9, stores a JAN code, a front image, a side image, a top image, a weight, a size and other set data for each commodity 1. A display memory 41-2 stores as image data an image of the commodity 1 picked up by the camera 4. An image buffer 413 temporarily stores image data stored in the display memory 41-2. A work memory 41-4 is a work table on which data other than the image data is processed.

Referring to a flow chart of FIG. 10, the pickup of an image of the commodity 1 with the image pickup aiding apparatus will be described. Before the image pickup operation based on the flow of this chart starts, the illumining device 25 is supported at a predetermined angle by the support arm 30 on top of the box 2, and the mirror plate 31 is also supported at a predetermined angle by the support arm 32 on top of the box 2. A program to realize the respective functions described in the flow chart is stored in the form of a program code readable by the CPU 40 in the recording medium 42 and loaded on the RAM 41.

In this state, first, the code of the commodity 1 is read by the hand scanner 39 (step S1), and then stored as a JAN code in the commodity file 41-1 of the RAM 41 (step S2). The commodity 1 is then placed on the rotary stage 7 within the image pickup box 2. The user then specifies an image of the commodity which the camera 4 picks up (step S3). At this time, the commodity images to be picked up are for the front, side and top of the commodity 1.

When the front image of the commodity is to be picked up, the camera 4 is placed so as to face the commodity 1, and the rotary stage 7 is rotated by the rotating mechanism 7b so that the front of the commodity 1 faces the camera 4. The rotary stage 7 is then moved up or down by the elevating mechanism 7a so that the commodity 1 is set at a predetermined height within the image pickup region of the camera 4. When the image side of the commodity is picked up, the rotary stage 7 is rotated by the rotating mechanism 7b in a state where the front image of the commodity is picked up so that the side of the commodity faces the camera 4. When the top image of the commodity is picked up, the camera is tilted by the tilting device 6 of the tripod 5 so as to face the mirror plate 31. In this state, the rotary stage 7 is rotated by the rotating mechanism 7b so that the front or side of the commodity 1 faces the camera 4. When the commodity 1 is placed on the rotary stage 7, the weight of the commodity 1 is measured by the piezoelectric sensor 16.

When the image pickup face of the commodity 1, for example, its front, is specified (step S3), the camera 4 picks up the front image of the commodity 1 (step S4), temporarily stores the picked-up image in memory, and stores the image and its commodity code in corresponding relationship in the commodity file 41-1 of the RAM 41 (step S5). The CPU 40 then determines whether the pick up of the image of the commodity 1 has ended (step S6). At this time, when another image, for example, an image of a side or top face, of the commodity 1 is desired to be picked up, the CPU returns its control to step S3, where it specifies an image pickup face different from that specified last, and repeats the above operation. When a plurality of desired face (for example, front, side and top) images of the commodity 1 have been pickup, data on the weight of the commodity 1 measured by the piezoelectric sensor 16 on the rotary stage 7 is temporarily stored in memory and then permanently stored in correspondence to its commodity code in the commodity file 41-1 of the RAM 41 (step 5S), and the CPU 40 terminates this flow-chart operation.

As described above, in the image pickup aiding apparatus, the illumining device 25 positioned closer to the commodity 1 than the camera 4 illumines the commodity 1 from above on its front side, so that when the image of the commodity 1 is picked up, and a clear image with reduced uneven illumination is obtained. In this case, the plurality of fluorescent tubes 27 are arranged on a plane in the illumining device 25 to produce plane emission light of an even intensity to illumine the commodity 1, so that the commodity 1 is substantially evenly illumined to thereby produce no blurs which occurred conventionally to thereby provide a clearer image. Since the camera hood 3 which shields external light from the camera 4 is provided between the camera 4 and the box 2, the camera is not influenced by the external light when the image is picked up and hence a good image of the commodity 1 is obtained. The back plate 33 is provided at the back 2c of the box 2 so as to be openable through a predetermined angle, so that when it is dark on the back side of the commodity 1, the back plate 33 can be opened through a predetermined angle at its top. Thus, external light is allowed to be introduced into the box 2 to illumine the back of the commodity 1. Thus, a clear image is also picked up.

In the image pickup aiding apparatus, the mirror 31 which reflects the image of the top surface of the commodity 1 toward the camera 4 is provided at a position on the box 2 above the commodity 1, and the camera 4 is supported through the tilting unit 6 on the tripod 5. Thus, the camera 4 is tilted in the vertical plane by the tilting unit 6, so that the camera 4 can be directed toward the front of the commodity or the mirror 31. Thus, the images of the front and top of the commodity 1 can easily be picked up. The rotary stage 4 is provided with the rotating mechanism 7b which rotates the rotary stage 7 along with the commodity 1 placed thereon, so that when the rotary stage 7 is rotated by the rotating mechanism 7b, the commodity 1 is rotated and hence the side image of the commodity is easily picked up.

In this case, the rotary stage 7 is provided with the elevating mechanism 7a which moves the commodity 1 up and down, so that even when the commodity 1 is large or small in size, the commodity can be set at a predetermined height within an image pickup region of the camera 4. Since the rotary stage 7 has the piezoelectric sensor 16 which measures the weight of the commodity, the weight of the commodity is automatically measured only by placing the commodity on the rotary stage 7. The cross scale 18 which represents the top-plan size of the commodity 1 is provided on the top 17 of the rotary stage 7, and a scale (not shown) which represents the height and width of the commodity 1 is also provided on the back plate 33, so that when the commodity 1 is placed on the rotary stage 7, the size of the commodity can be known. The white adjustment marks 19 are provided on the side of the rotary stage 7, so that when the commodity 1 is illumined, for example, by the illumining device 25 or spotlighted externally, the chromaticity of the camera 4 can easily be adjusted to the white adjustment marks 19 and hence a color image appropriate for the commodity 1 is obtained.

In this image pickup aiding apparatus, the image of the commodity 1 picked up by the camera 4 is stored along with the pre-input commodity code in corresponding relationship in the RAM 41. Thus, for example, the stored image can be displayed on the display unit 36 or printed by the printer 44 along with the commodity code as well as can be easily processed depending on its use. Since the front display unit 20 and top surface display 21 which display data on the number of images picked up, weight and size of the commodity 1 are arranged within the box 2, so that the information displayed on the displays 20 and 21 can be picked up simultaneously by the camera 4. Thus, the image of the commodity 1 and the information displayed by the display units 20 and 21 can be picked up simultaneously. When the image pickup aiding apparatus is not used, the camera hood 3 is removed from the front 2a of the box 2, the support arms 32 and 30 of the mirror plate 31 and illumining device 25, respectively, are pushed over sidelong, so that the mirror plate 31 overlaps with the illumining device 25 to thereby be compactly and conveniently folded into within the box 2 and easily transported.

While in the first embodiment the camera 4 is illustrated as supported on the tripod 5, the present invention is not limited to this particular case. For example, a first modification of FIGS. 11A and B or a second modification of FIGS. 12A and B may be employed instead.

Figure 11A:
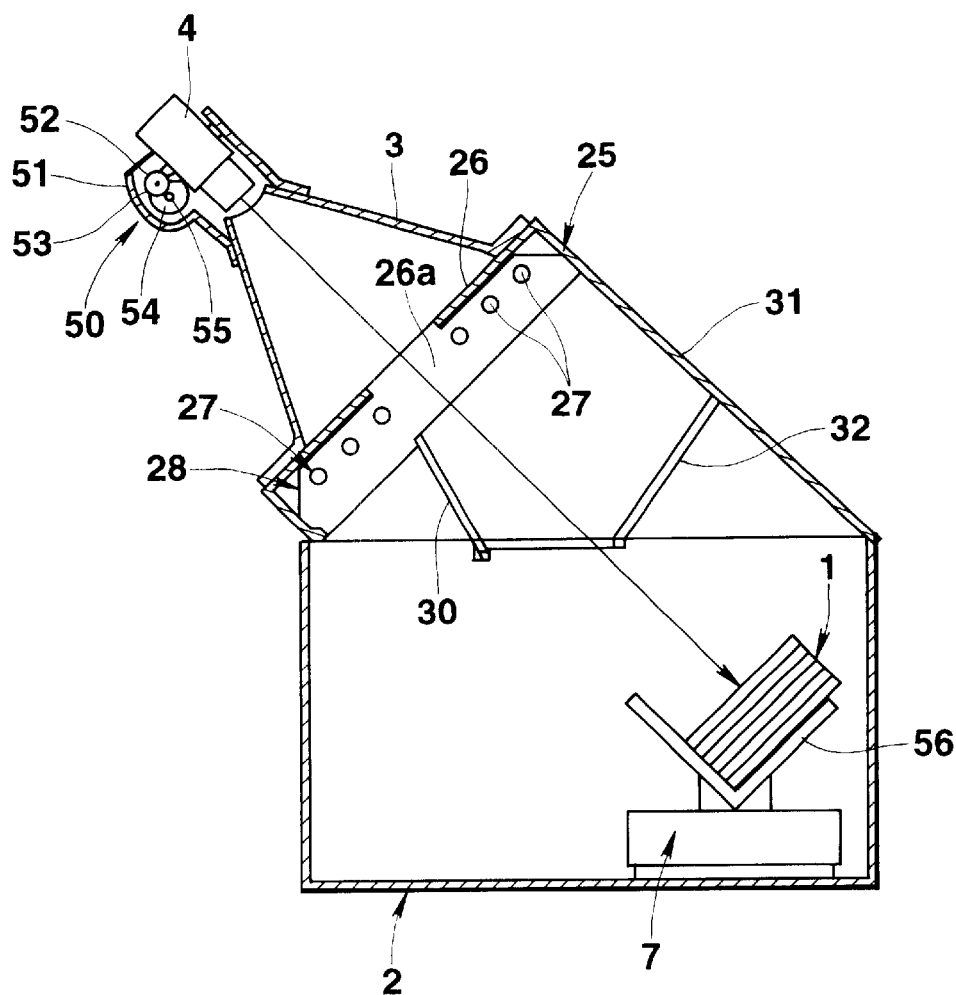
FIG. 11A is a cross-sectional view of a modification of the first embodiment of the image pickup aiding apparatus.

In the first modification of FIGS. 11A and B, an illumination case 26 of the illumining device 25 has a central opening 26a in a front surface thereof. A camera hood 3 is attached removeably over the front surface of the case 26. An image pickup camera 4 is attached through an angle adjusting device 50 to a forward end of the camera hood 3. The angle adjusting device 50 has a rotatable support shaft 52 within a case 51. The camera 4 and a gear 53 are attached integrally with the supports shaft 52. A pinion 55 is attached to an output shaft of a motor 54 provided within the case 51 and meshes with the gear 53 of the support shaft 52. When the motor 54 rotates and hence the gear 53 rotates through the pinion 55, the camera 4 turns around the support shaft 52. A base 56 on which a commodity 1 is placed is provided on the top 17 of the rotary stage 7 within the box 2. The base 56 takes the form of a V open at substantially 90 degrees on which the commodity is placed with an angle of about 45 degrees to the base 56.

Figure 11B:
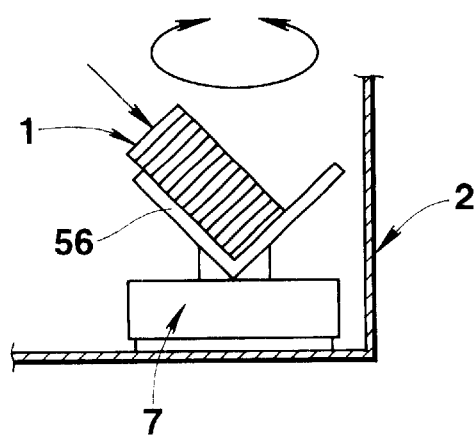
FIG. 11B shows a rotary stage of the image pickup aiding apparatus rotated through 180 degrees from the state of FIG. 11A.

As shown in FIG. 11A, in the first modification of the image pickup aiding apparatus, by placing the commodity 1 on the support base 56 of the rotary stage 7 with the front of the commodity 1 facing the camera 4, the front image of the commodity 1 is picked up by the camera 4. When the rotary stage 7 is rotated through 180 degrees in this state, the top of the commodity faces the camera 4 as shown in FIG. 11B, and the image of the top of the commodity is picked up. Thus, only by the rotating the rotary stage 7, the front and top images of the commodity 1 are easily picked up without moving the camera 4 substantially. At this time, when the front and top images of the commodity are picked up at different heights, the support base 56 is moved up or down by the elevating mechanism 7a of the rotary stage 7 to adjust the height of the commodity as in the first embodiment. In addition, the tilt of the camera 4 relative to the commodity 1 is finely adjustable by the tilt adjusting device 50, so that the image pickup angle can be finely set.

Figure 12A:
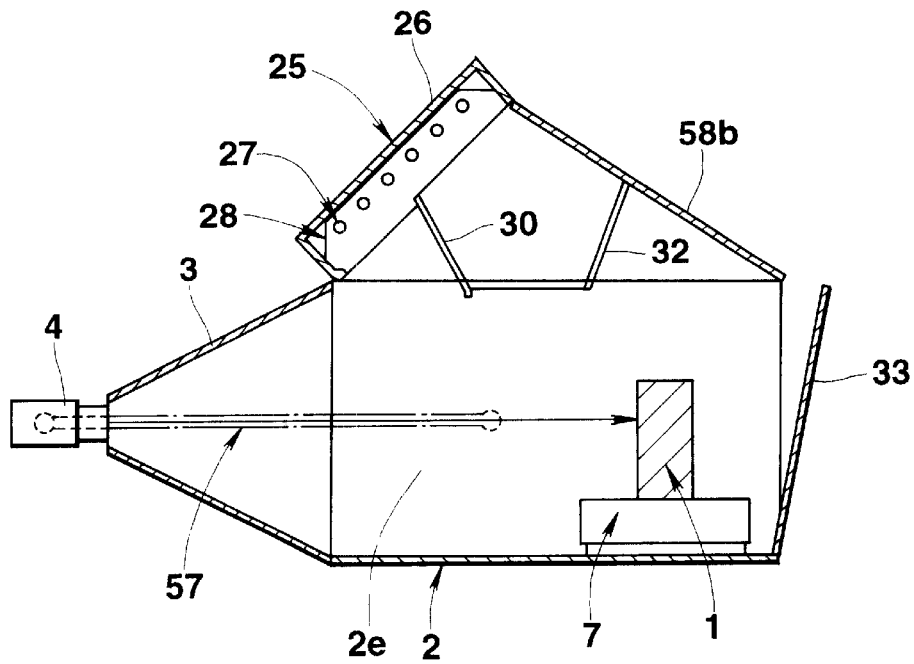
FIG. 12A shows a second modification of the first embodiment of image pickup aiding apparatus placed in a state where a front image of the commodity is picked up.
Figure 12B:
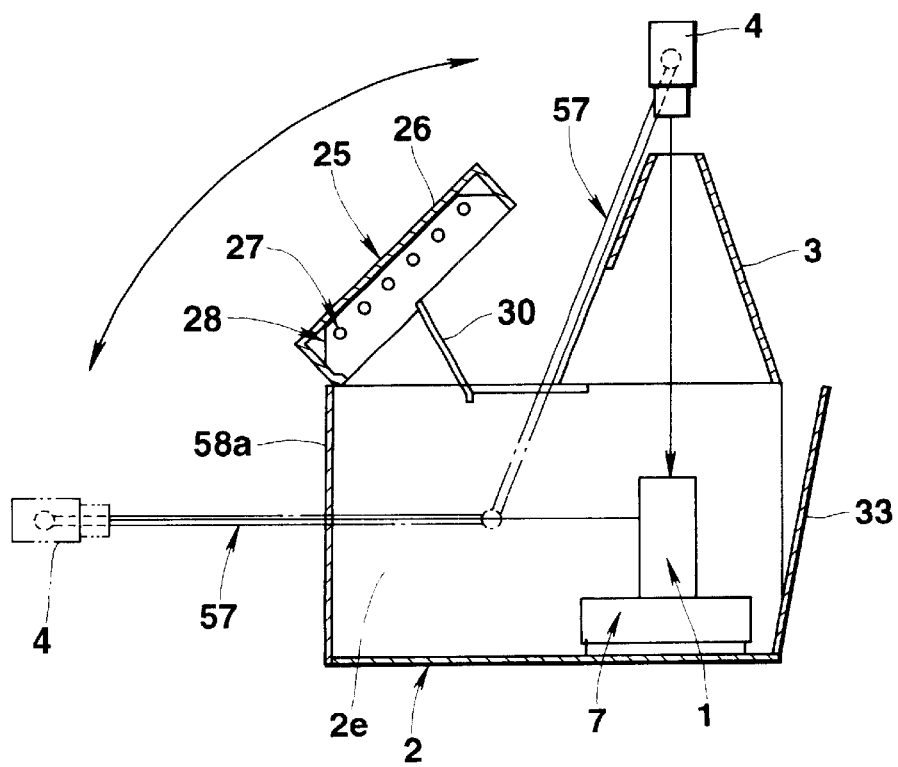
FIG. 12B shows the second modification of the first embodiment placed in a state where a top image of the commodity is picked up.

In the second modification of the image pickup aiding apparatus of FIGS. 12A and B, a camera support arm (moving device) 57 is provided turnably around one end within the box 2 in the vertical plane on the outer side 2e of the box 2. The camera 4 is attached rotatably at the other end of the camera support arm 57, which can be pushed over substantially sidelong so as to take a horizontal attitude to thereby dispose the camera 4 before the front of the commodity 1 to pick up the front image of the commodity 1. By causing the camera support arm 57 to stand up to dispose the camera 4 above the commodity 1, the top image of the commodity 1 is picked up. In this case, a front plate 58a and a top plate 58b are attached removably to the front and the top, respectively, of the box 2. As shown in FIG. 12A, when the front image of the commodity 1 is picked up, the top plate 58b is supported on top of the box 2 by the support arm 32, the front plate 58a is removed from the front of the box and the camera hood 3 is instead attached to the front of the box. As shown in FIG. 12B, when the top image of the commodity is picked up, the fronts plate 58a is attached to the front of the box 2, the top plate 58b is removed from the top of the box 2, and the camera hood 3 is attached to the top of the box 2 so as to open at its lower portion on the side of the illumining device 25.

In this image pickup aiding apparatus, the camera support arm 57 is turned in the vertical plane, so that the camera 4 is easily moved to the respective front and top sides of the commodity 1. Thus, the front and top images of the commodity 1 are easily picked up.

Referring to FIGS. 13–17 a second embodiment of the image pickup aiding apparatus according to the present invention will be described. An element of the second embodiment similar to that of the first embodiment is identified by the same reference numeral as was used to identify that element of the first embodiment of FIGS. 1–10, and further description thereof will be omitted.

Figure 13:
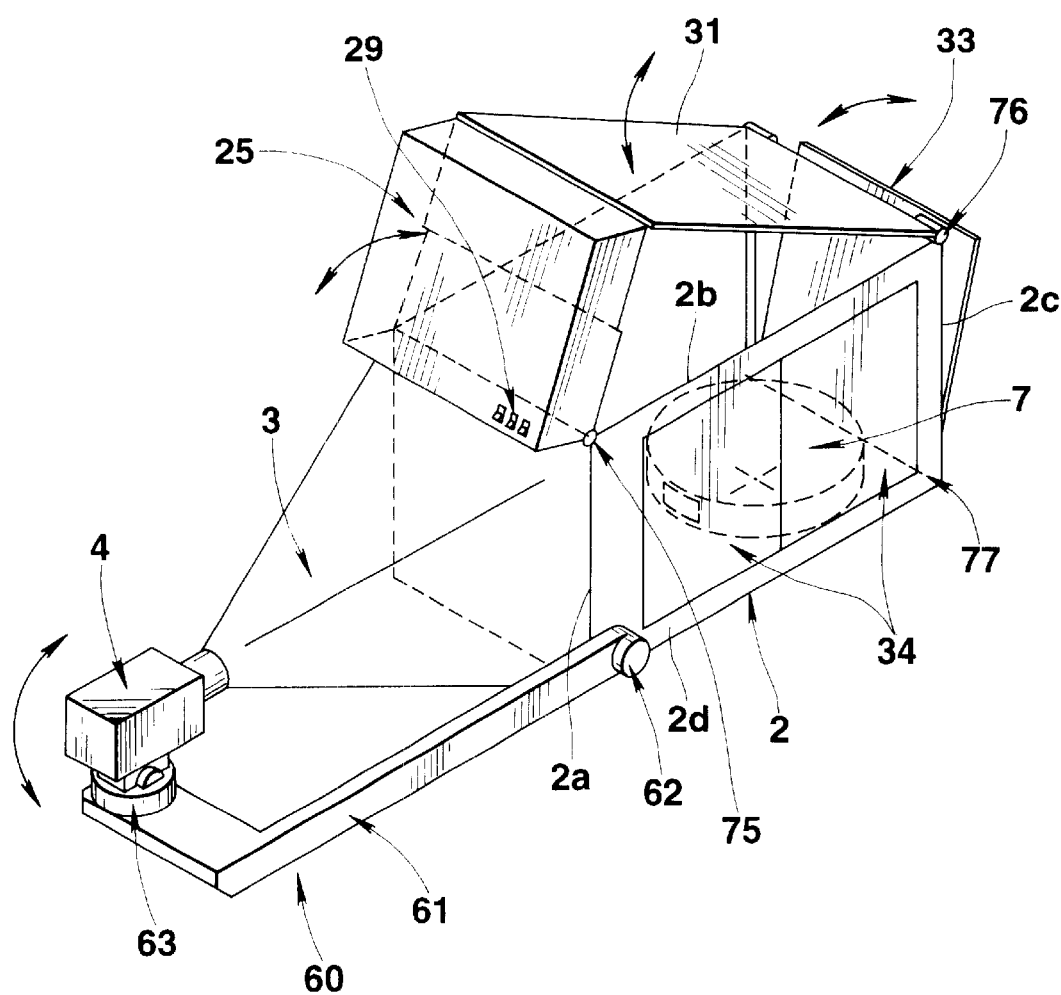
FIG. 13 is a perspective view of a second modification of the pickup aiding apparatus whose several parts are omitted.

As shown in FIG. 13, the box 2 of the image pickup aiding apparatus includes a camera moving mechanism 60 which holds and moves the camera 4. The mechanism 60 is provided with a U-like swing arm 61 attached by a first hinge mechanism 62 to a lower end of the box front 2a so as to be turnable around the hinge mechanism in the vertical plane. The camera 4 is provided through a camera base 63 at a free end of the arm 61. The camera 4 faces the end of the camera hood 3 attached to the front 2a of the box 2 as in the first embodiment. The camera hood 3 is made of a flexible material such as rubber.

Figure 14:
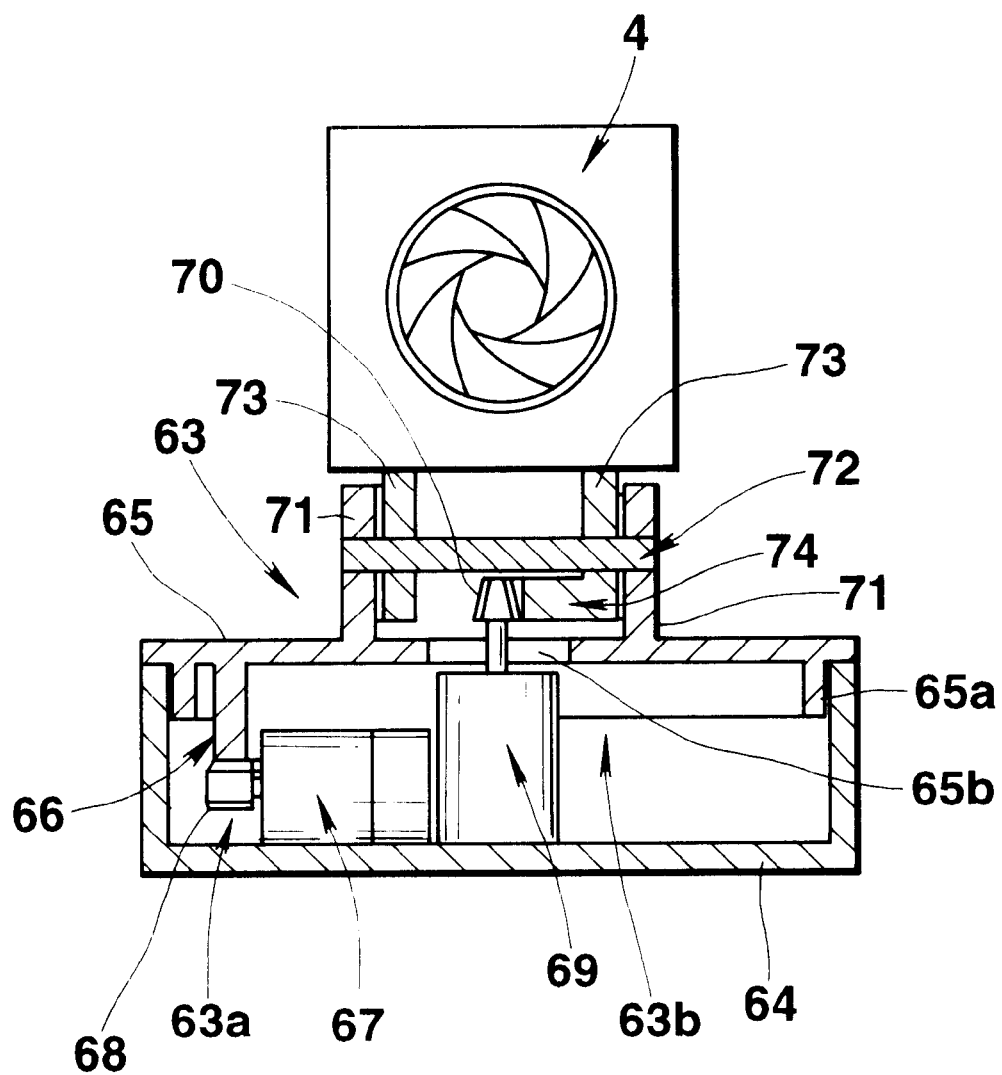
FIG. 14 is a front cross-sectional view of a camera base of FIG. 13.
Figure 15:
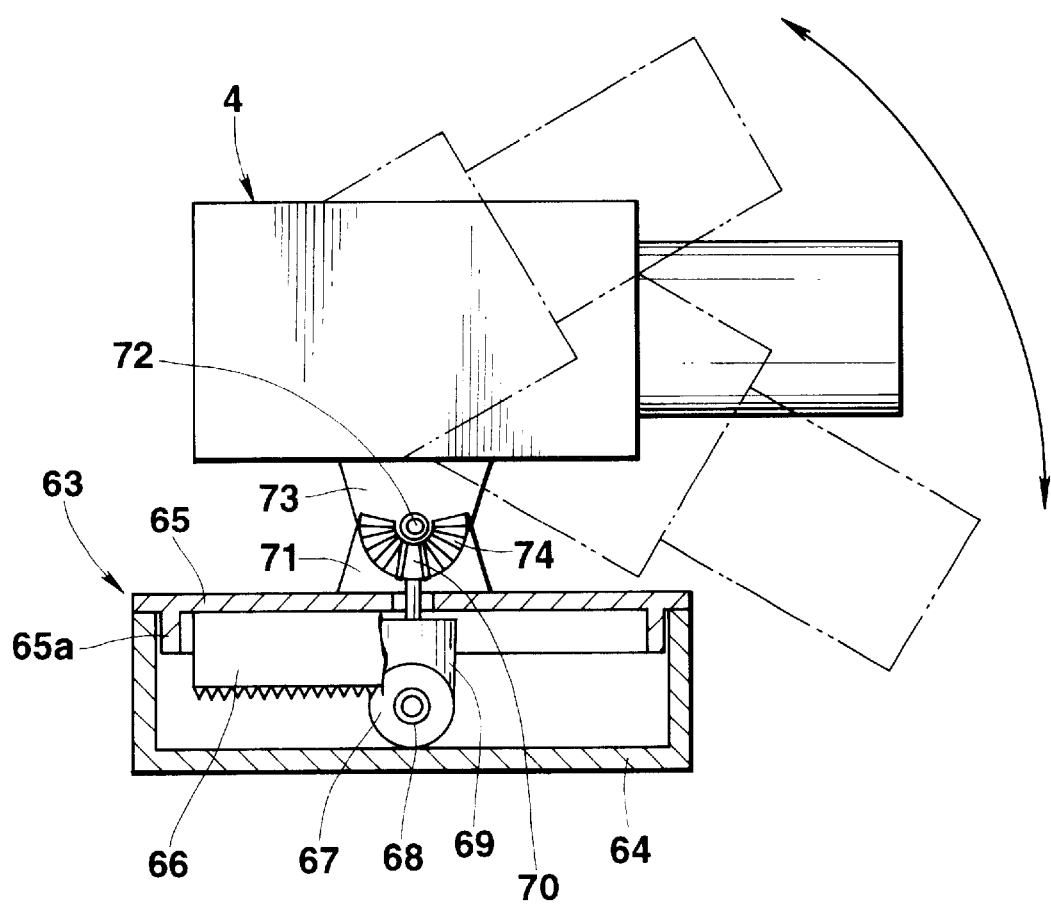
FIG. 15 is a side cross-sectional view of the camera base of FIG. 14.
Figure 16:
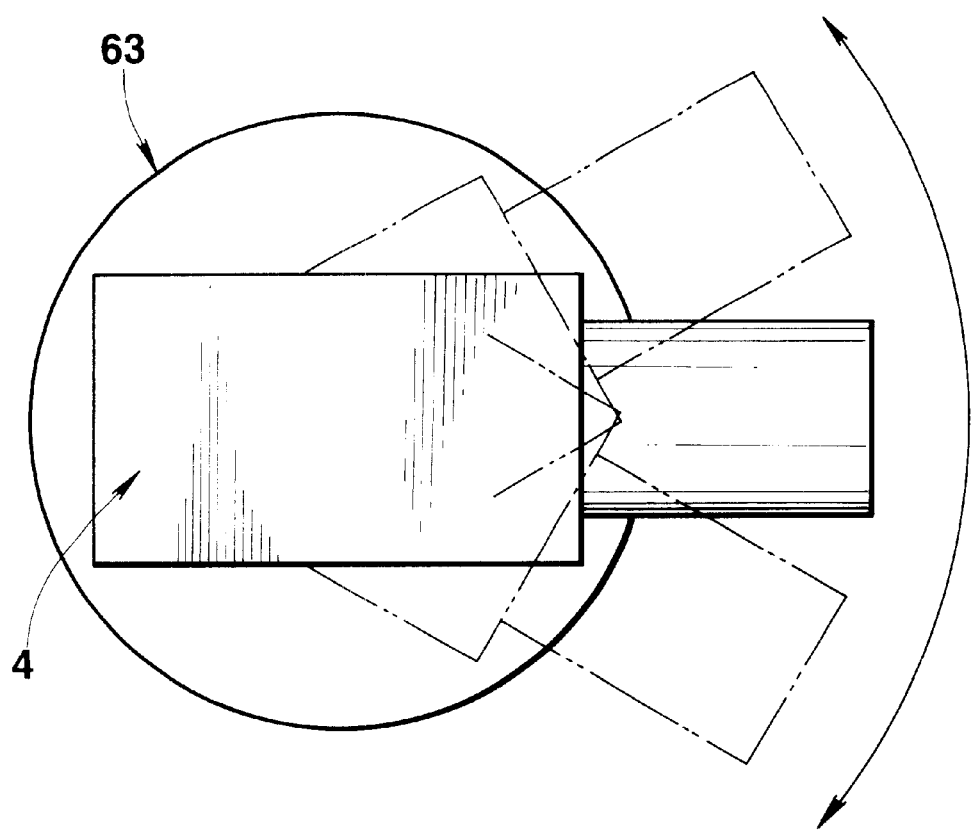
FIG. 16 is a plan view of a camera placed on the camera base of FIG. 14, illustrating the rotational direction of the camera by the camera base.
Figure 17:
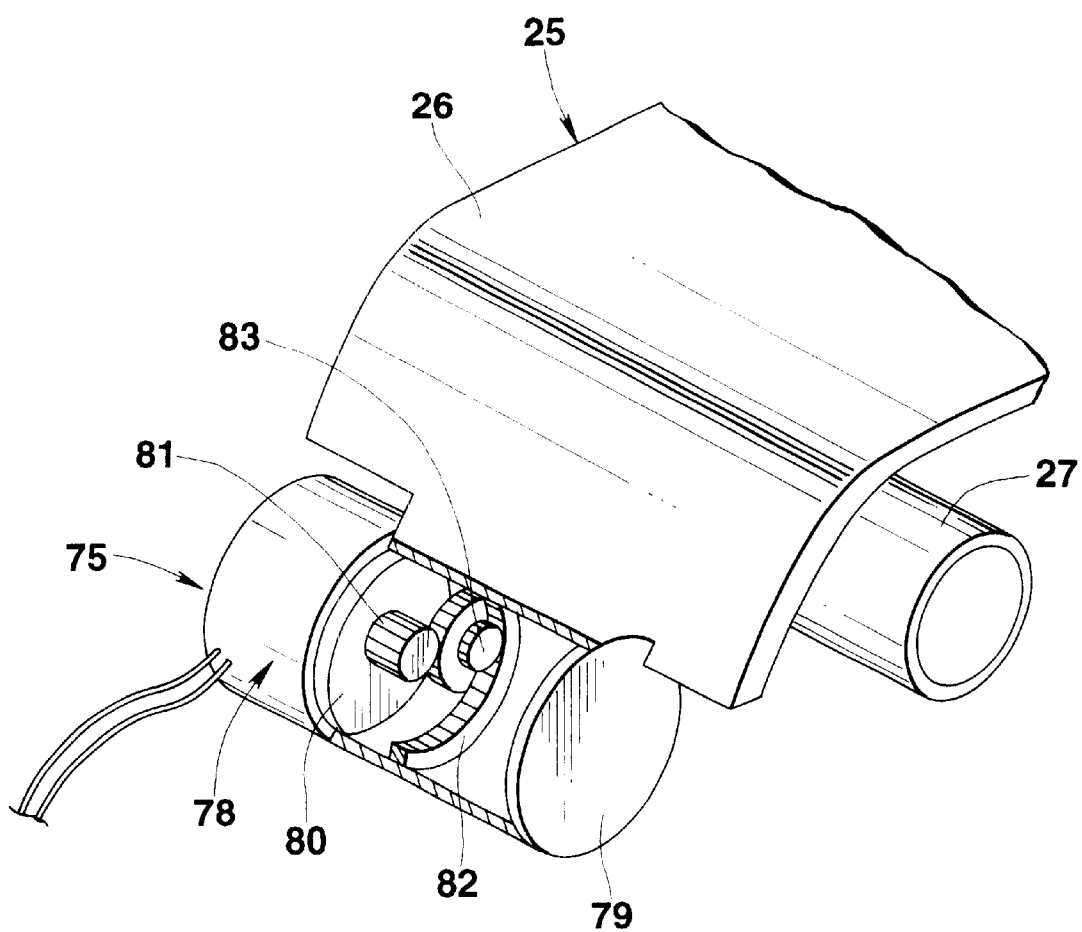
FIG. 17 is a fragmentary perspective view of a main portion of a second hinge mechanism of an illuminating device of FIG. 13.
Figure 18:
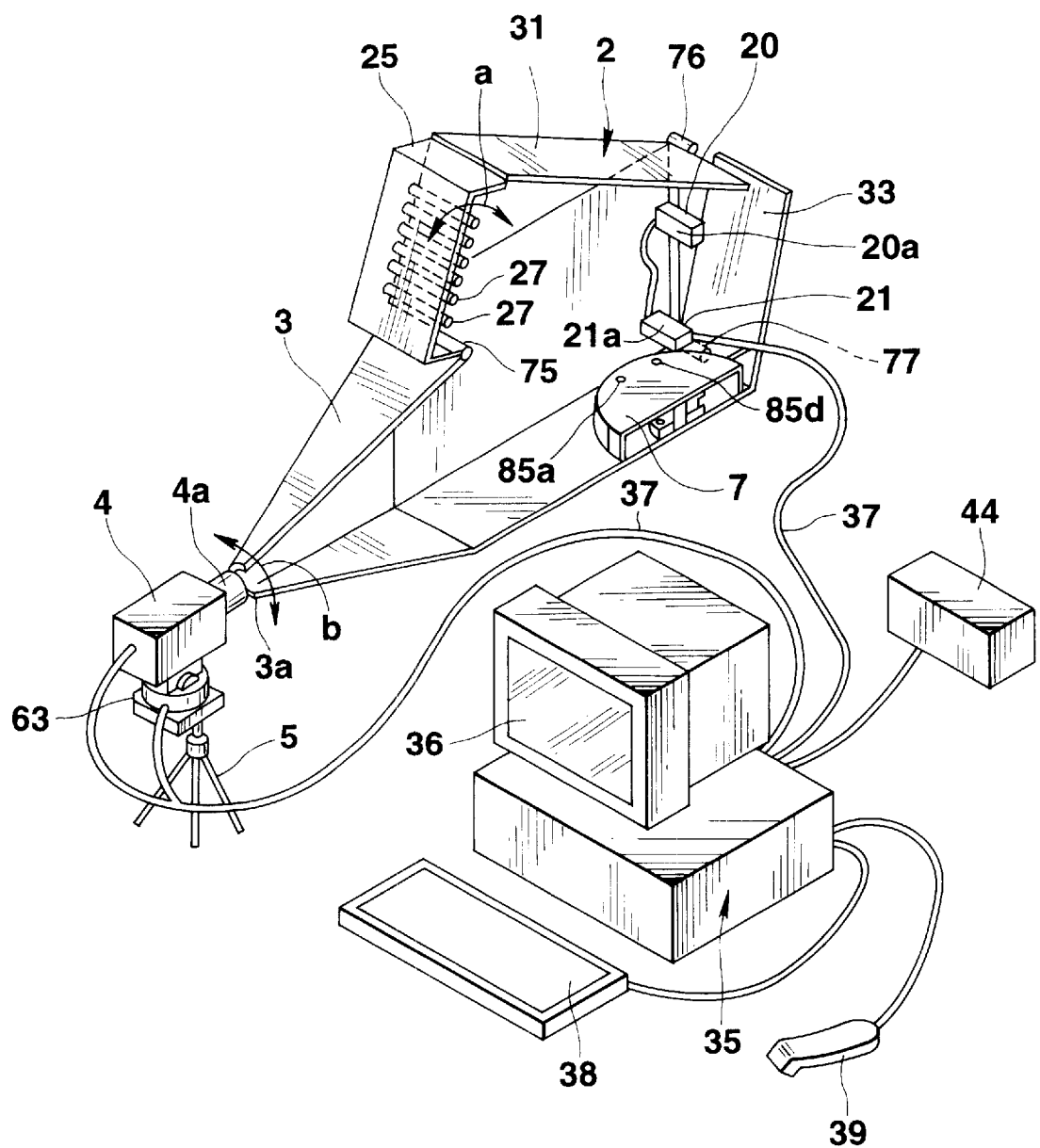
FIG. 18 illustrates the whole composition of a third embodiment of the image pickup aiding apparatus (commodity image data processor) according to the present invention.

As shown in FIGS. 14–16, the camera base 63 includes a hollow cylindrical control case 64 provided at the end of the swing arm 61 with a rotating mechanism 63a and a tilting mechanism 63b being provided within the control case 64.

In the rotating mechanism 63a, a rotating disc 65 is provided rotatably by guide ribs 65a on top of the control case 64 with a cylindrical gear 66 integral with a lower end of the rotating disc 65 meshing with a pinion 68 provided on an output shaft of a rotating motor 67 provided within the controller case 64 to thereby able to rotate the rotating disc 65 through 360 degrees when the pinion 68 rotates.

In the tilting mechanism 63b, a tilting motor 69 is provided at substantially the center of the control case 64. The tilting motor 69 has an output shaft which extends through a hole 65b provided at the center of the rotating disc 65 with. a drive bevel gear 70 being provided on the upper end of the output shaft. A pair of upstanding supports 71 are provided on the rotating disc 65 so that the drive bevel gear 70 is disposed between the supports 71 of the pair. A pair of support legs 73 which hold the camera 4 are provided rotatably to the pair of supports 71 through a connecting shaft 72. One of the support legs 73 is provided with a follow bevel gear 74 which meshes with the drive bevel gear 70. When the drive bevel gear 70 is rotated, the follow bevel gear 74 is rotated. Thus, the camera tilts in the vertical plane as shown in FIG. 15. The rotating and tilting motors 67 and 69 are provided with position sensors such as encoders to sense the rotational and tilted positions, respectively, of the camera 4.

As shown in FIG. 13, an illumining device 25 is provided turnably in the vertical plane through a second hinge mechanism (illumining drive mechanism) 75 on top of the front 2a of the box 2. A mirror plate 31 is provided turnably in the vertical plane through a third hinge mechanism 76 on top of a back 2c of the box 2. A back plate 33 is connected through a fourth hinge mechanism 77 at a lower end of the back 2c of the box 2 so as to turn backward.

All the first-fourth hinges 62, 75–77 are the same in structure. The second hinge mechanism 75 of the illumining device 25 will be specifically described herein as a typical one with reference to FIG. 17. The hinge mechanism 75 is provided with a hollow cylindrical fixed hinge 78 fixed to the box 2, and a hollow cylindrical movable hinge 79 provided rotatably and coaxially with the fixed hinge 78.

An electric motor 80 is provided within the fixed hinge 78 with an output shaft of the motor 80 protruding along the axis of the movable hinge 79 in same. A pinion 81 is attached to an end of the output shaft of the motor 80. Attached to the outer periphery of the movable hinge 79 is a case 26 of the illumining device 25 with a ring-like inner gear 82 being provided on the inner surface of the movable hinge 79 in substantially corresponding relationship to the pinion 81. An intermediate gear group 83 is provided rotatably to the fixed hinge 78 between the inner gear 82 and the pinion 81. The intermediate gear group 83 includes two gears with one of them meshing with the pinion 81 and the other meshing with the inner gear 82.

Thus, in this hinge mechanism 75, a rotation of the motor 80 is transmitted through the pinion 81 to the intermediate gear group 83, whose rotation is, in turn, transmitted to the inner gear 82, so that the movable hinge 79 is rotated relative to the fixed hinge 78 and hence the illumining device 25 is turned relative to the box 2. The motor 80 is provided with a position sensor such as an encoder, like the rotating and tilting motors 67 and 69, to sense the tilting position of the illumining device 25.

A rotary stage 7, a front display unit 20 and a top display unit 21 are provided within the box 2, as in the first embodiment. A controller 35, a display unit such as a CRT 38, a keyboard 38 and a hand scanner 39 are disposed outside the box 2, as in the first embodiment. The controller 35 is electrically connected by cables to the display 36, keyboard 38 and hand scanner 39 as well as to the camera 4, rotary stage 7, front display unit 20, top display unit 21, illumining device 25, camera base 64, and first-fourth hinge mechanisms 62, 75–77.

As described above, this image pickup aiding apparatus produces beneficial effects similar to those produced by the first embodiment, as well as is capable of adjusting,the illumining angle of the illumining device 25 which illumines the commodity 1 from above on its front side with the second hinge mechanism 75 which is an illumination drive mechanism. Thus, when an image of the commodity 1 is picked up, the commodity 1 is illumined well, so that uneven illumination is reduced compared to the first embodiment to thereby provide a clearer image. The commodity 1 is rotated by the rotary stage 7, and the camera moving mechanism 60 moves the camera 4 relative to the commodity 1, so that the images of the front, side and top of the commodity 1 are easily picked up. When the images of the commodity 1 are picked up by the camera 4, the operation of the whole image pickup aiding apparatus is controlled by the CPU 40 and the motor driver 85 on the basis of preset motor control data. Thus, the images of the commodity 1 are automatically picked up, so that even a person who has no special photographing technique can easily pickup the images of the commodity 1. By controlling the whole device manually to detect the operational position of the device, front, side and top image pickup data are easily created and hence motor control data are created easily for motor controlling purposes.

While in the second embodiment the first-fourth hinge mechanisms 62, 75–77 are illustrated as transmitting the rotation of the motors to the respective elements concerned through the gear mechanisms, the present invention is not limited to this particular case. For example, a cam mechanism may be used instead or a link mechanism may be used which converts the motor rotation to a linear movement which is then transmitted to an element concerned.

While in the first and second embodiments the illumining device 25 is illustrated including the plurality of fluorescent tubes 27 arranged in the plane, the present invention is not limited to this particular case. For example, a plane light-emitting panel composed of electroluminescence elements may be used instead.

While in the first and second embodiments the piezoelectric sensor 16 is illustrated as provided on the rotary stage 7 to measure the weight of the commodity, the present invention is not limited to the particular case. Any digital balance may be used as long as it can measure the weight of the commodity 1.

Referring to FIGS. 18–36, a third embodiment of the image pickup aiding apparatus according to the present invention will be described. The same reference numeral as was given to similar elements of the first and second embodiments is also given to a similar element of the third embodiment, and further description thereof will be omitted.

The third embodiment does not include a camera moving mechanism such as is shown at 60 in the second embodiment. Instead, in the third embodiment, the camera 4 is set by a tripod 5 so that its lens 4a aligns with a lens arrangement window 3a for the camera hood 3, and is arranged so as to be turned as shown by an arrow b in FIG. 18 by a camera tilting mechanism 63 (similar to that of the second embodiment) provided between the camera 4 and tripod 5 with the aid of front and top image pickup angles.

Since a size measuring device 90 (FIG. 19) which automatically measures the size of a commodity 1 is used in the third embodiment, the rotary stage 7 has holes 85a–85d (85b, 85c are not shown) in which connecting pins 91a–91d of the size measuring base 90 are fitted.

Figure 19:
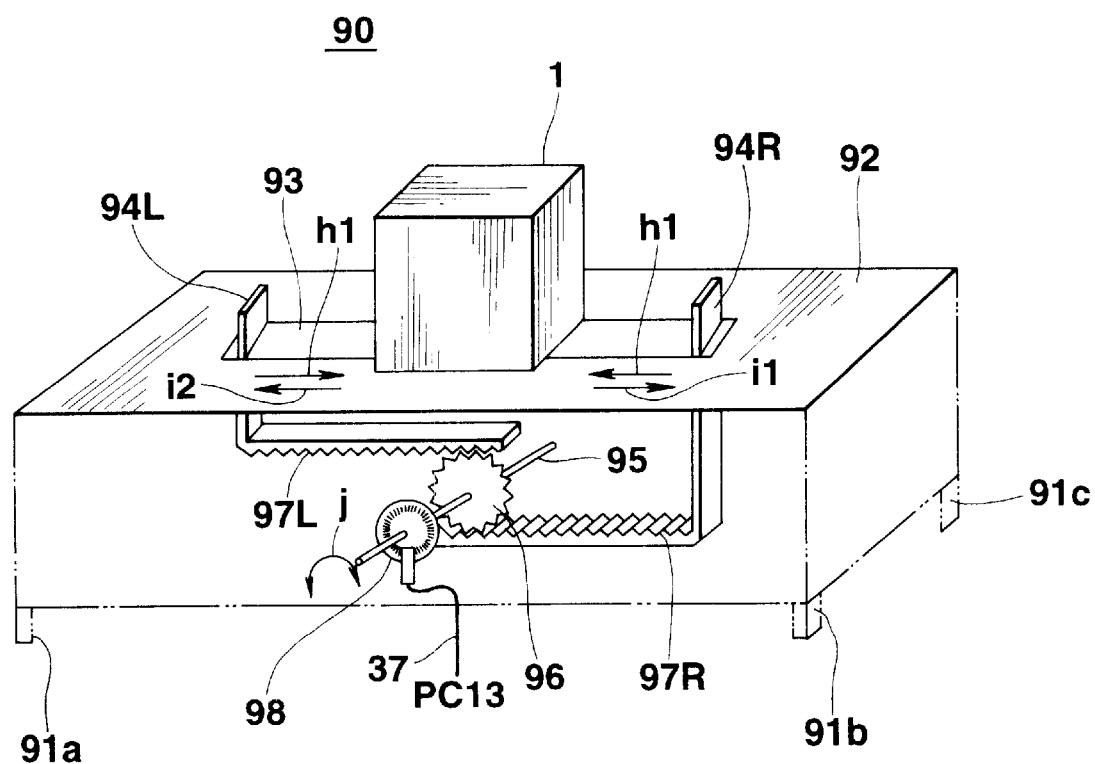
FIG. 19 is a perspective view of a size measuring device attached removably on a rotary stage of the commodity image data processor.

FIG. 19 illustrates the composition of the size measuring device 90 attached removably to the upper surface of the rotary stage 7. The size measuring device 90 is provided on the rotary stage 7 to measure the size of the commodity 1 automatically when the image of the commodity 1 is picked up. A top surface of a base 92 of the device 90 has a strip-like measuring window 93 in which a pair of L-like measuring plates 94R and 94L are provided so as to be slidable lengthwise in the window 93 with one branch of each of the L-like plates 94R and 94L extending upward through the window 93 of the size measuring device 90.

A rotation of a rotating shaft 95 of a size measuring motor (not shown) is transmitted from a rotational gear 96 attached to the rotational shaft 95 to a pair of slide gears 97R and 97L to slide the measuring plates 94R and 94L so as to move closer to or away from each other as shown by arrows h1 and h2 or i1 and i2, respectively. An encoder 98 is provided for the rotational shaft 95 to measure a rotational quantity of the shaft 95 in the rotational direction of arrow j. Data on this rotational quantity is delivered as representing the measured sliding distances of the measuring plates 94R and 94L via an image pickup data control bus 37 to the controller 36.

More particularly, in the size measuring decvice 90, the length of the strip-like window 93 on the base top 92 is already known. By sliding the measuring plates 94R and 94L placed at the opposite ends of the window 93 until they come in contact with the commodity 1 and causing the encoder 98 to measure the distances through which the measuring plates 94R and 94L have slid, the width W of the commodity 1 is measured or calculated. The height H and depth D of the commodity 1 are calculated on the basis of the ratios of the height H and depth D of the commodity to its width W measured by detection of edges of the front and side images of the commodity 1 picked up by the camera 4.

When the width of the commodity 1 is measured by sliding the measuring plates 94R and 94L so as to come into contact with the commodity 1, the commodity 1 is placed necessarily at the center of the base 92 and hence the rotary stage 7.

Figure 20:
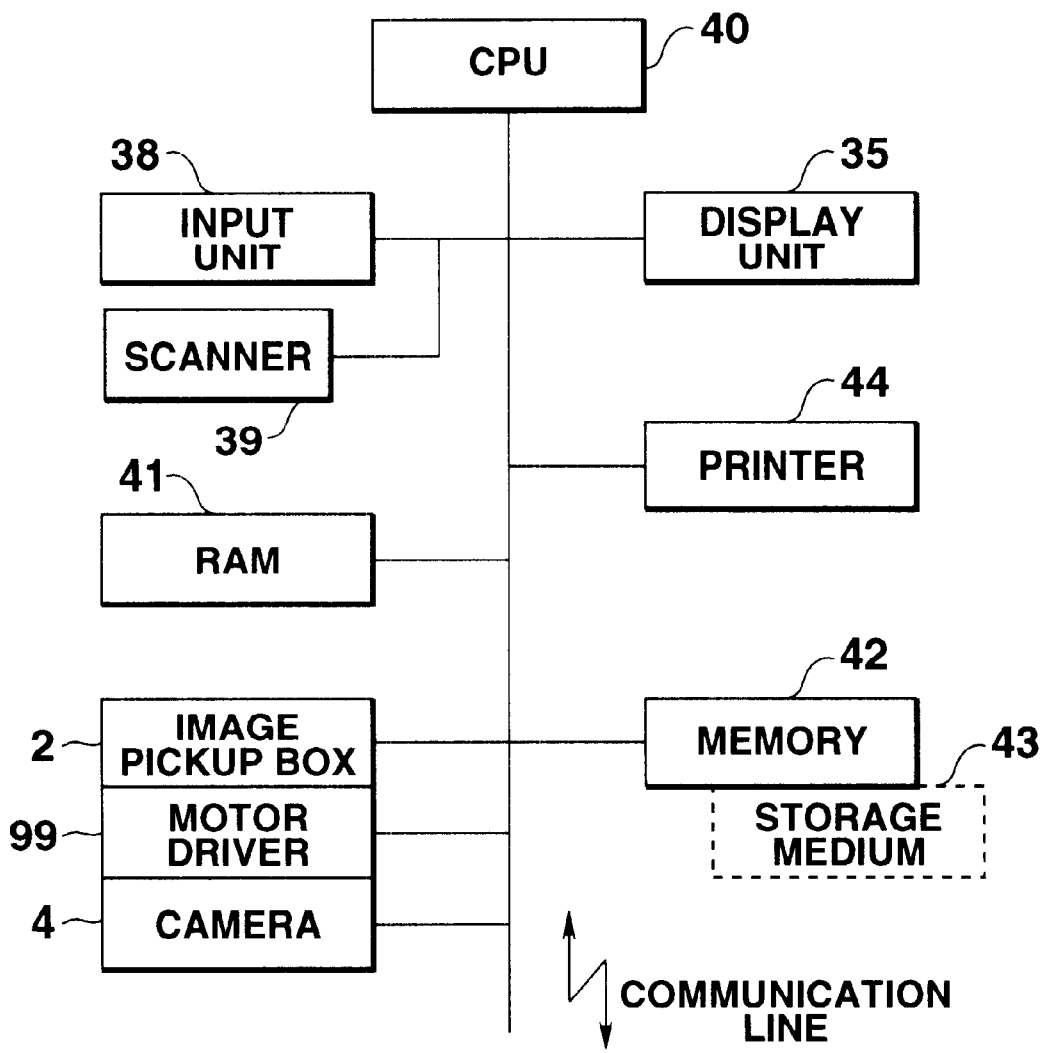
FIG. 20 is a block diagram of the commodity image data processor of FIG. 18.

FIG. 20 is a block diagram of the image pickup aiding apparatus of the third embodiment (hereinafter referred to as a commodity image data processor because the image data processing is mainly described in the third embodiment). The image pickup aiding apparatus includes a controller (computer) 35 which comprises a CPU 40 as a center. In this block diagram, the contents of a RAM 41 are different from those of the RAM of the first embodiment.

Figure 21:
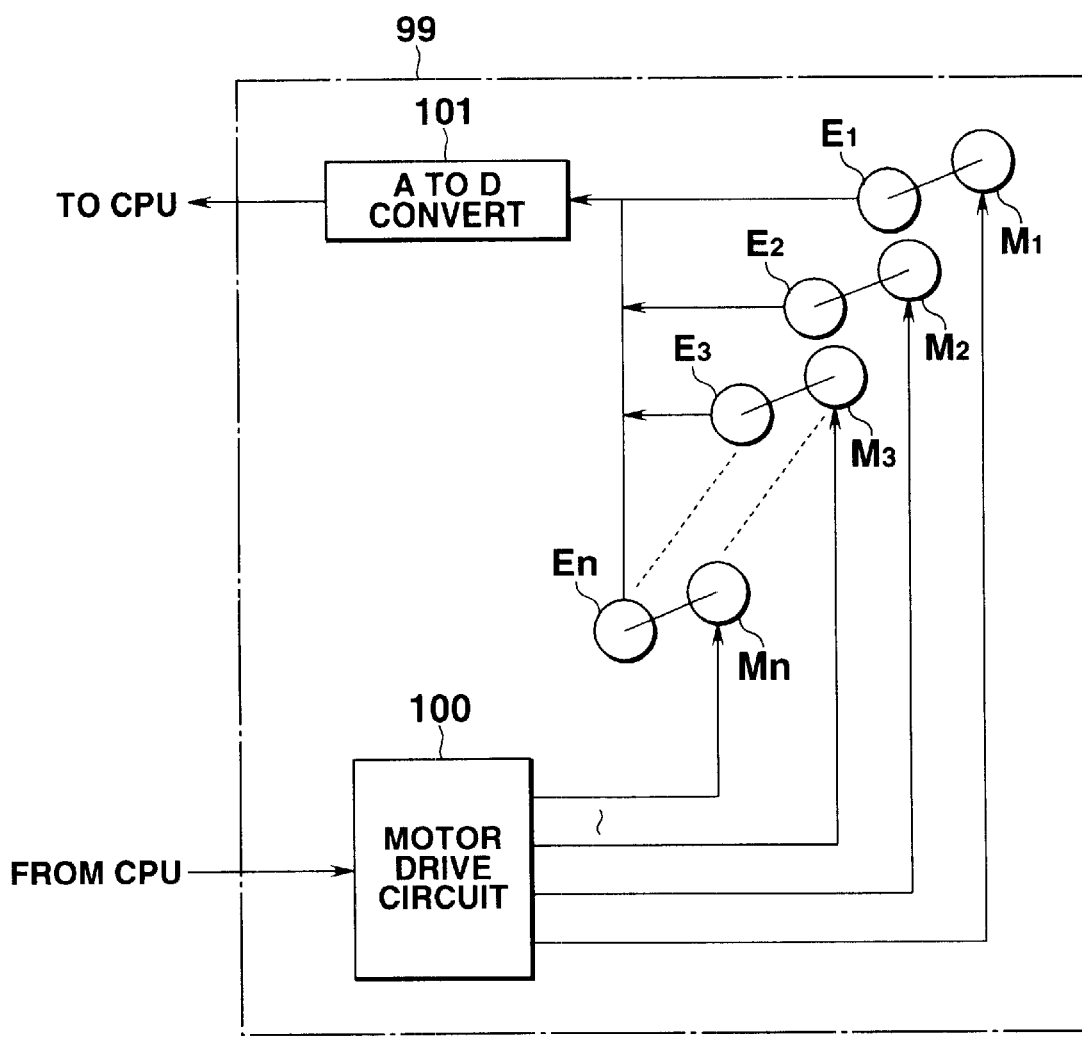
FIG. 21 is a circuit diagram of a motor driver of FIG. 20.

Referring to FIG. 21, the circuit composition of a motor driver 99 in the third embodiment will be described next. The motor driver 99 includes a motor drive circuit 100 and an A to D converter 101. The motor drive circuit 100 selects and drives one of motors M1–Mn in accordance with a drive control command from the CPU 40. The A to D converter 101 converts each of detection signals output from the position sensors E1–En which sense the respective rotational positions of the motor M1–Mn driven by the motor drive circuit 100 to a corresponding digital signal, which is then delivered to the CPU 40. In this case, the motors M1–Mn are used to drive the rotary stage 7, camera tilting mechanism 64, and first-third hinge mechanisms 75–77, respectively. The position sensors E1–En include encoders provided at the respective motors M1–Mn.

Figure 27:
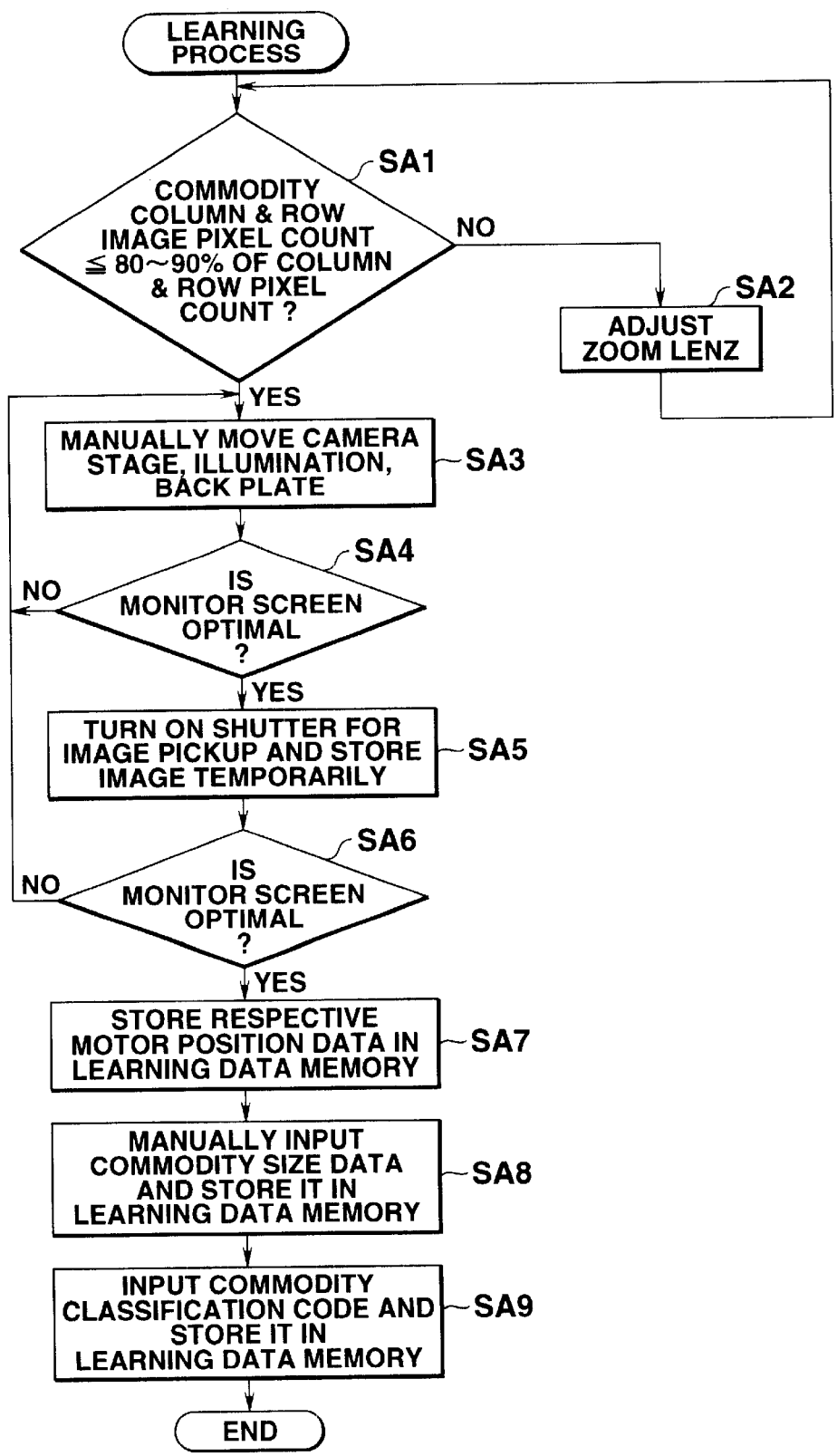
FIG. 27 is a flow chart of a learning process performed by the commodity image data processor.
Figure 28:
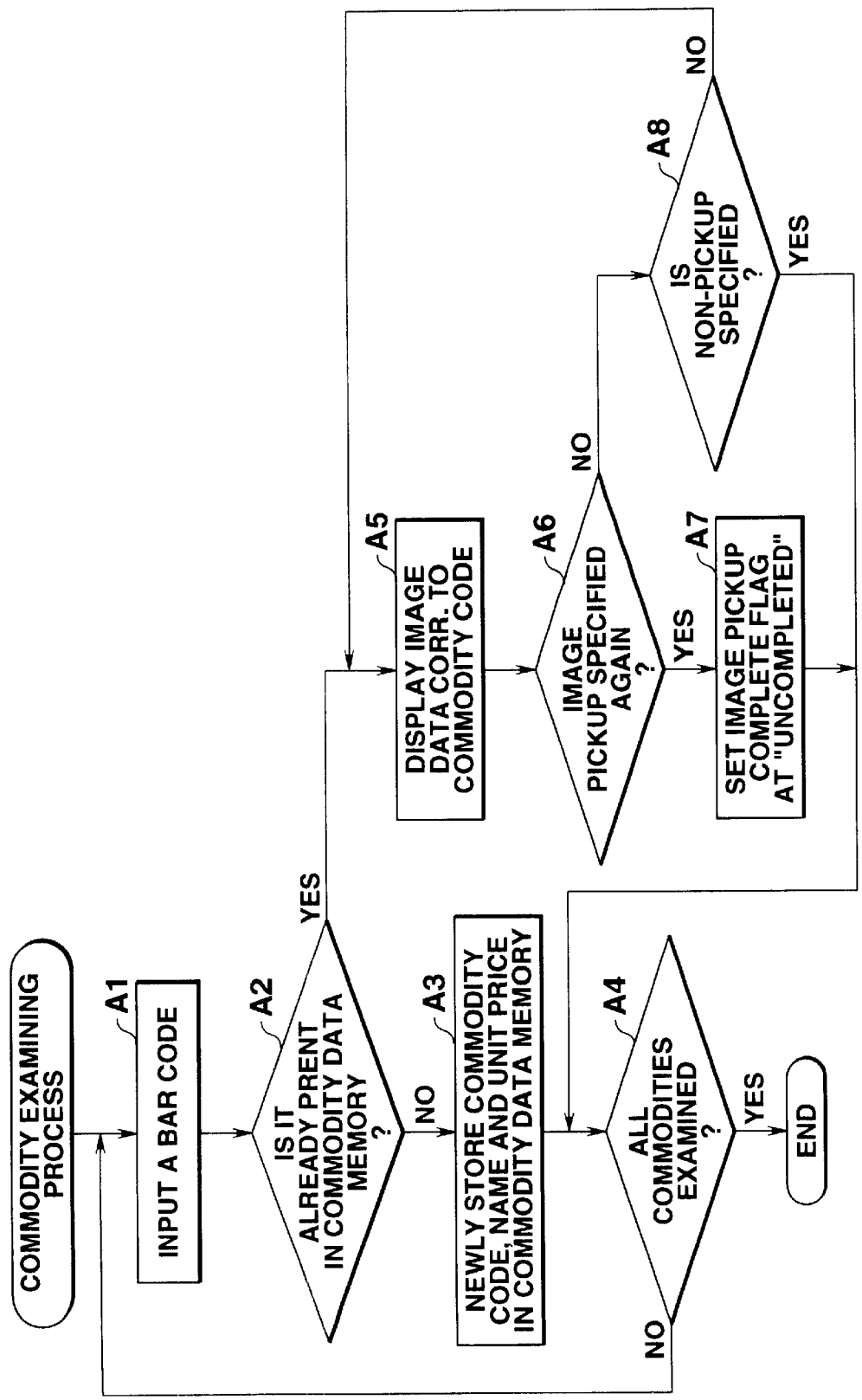
FIG. 28 is a flow chart of a commodity examining process performed by the commodity image data processor.
Figure 31:
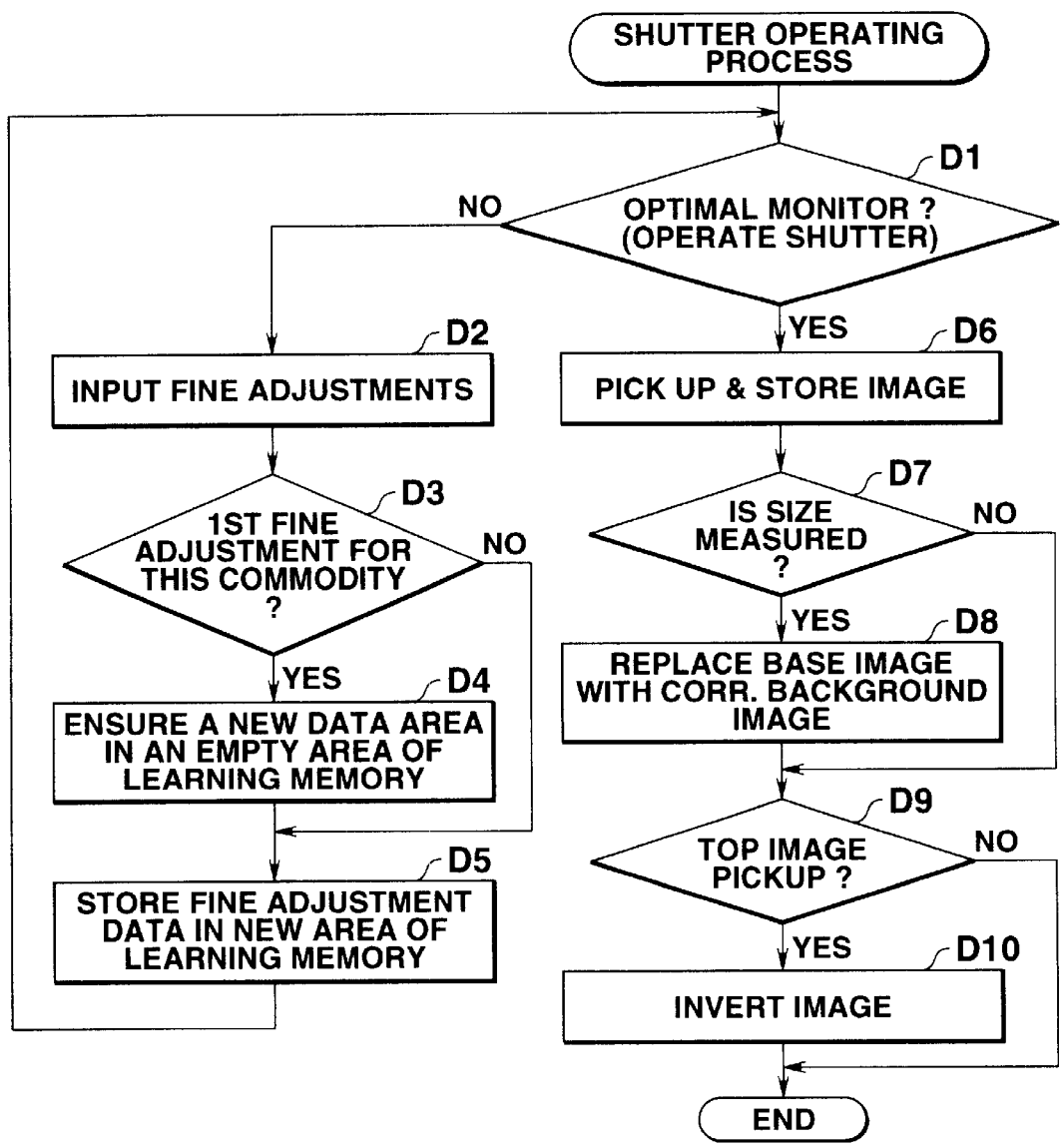
FIG. 31 is a flow chart of a shutter operating process involved in the image pickup process of FIG. 29.
Figure 32:
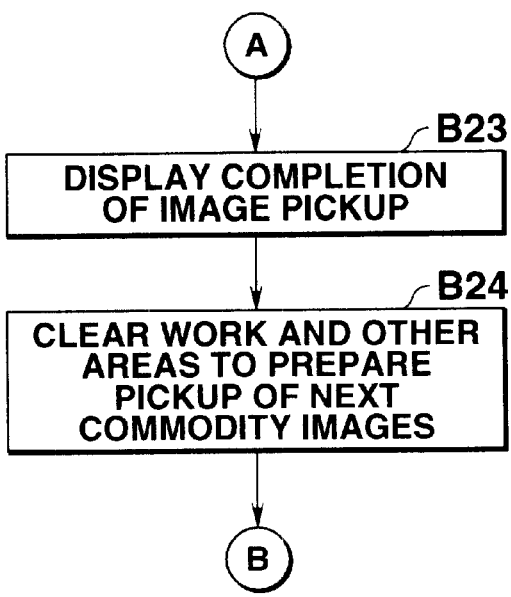
FIG. 32 is a flow chart of a post-image pickup processes involved in the image pickup process.
Figure 33:
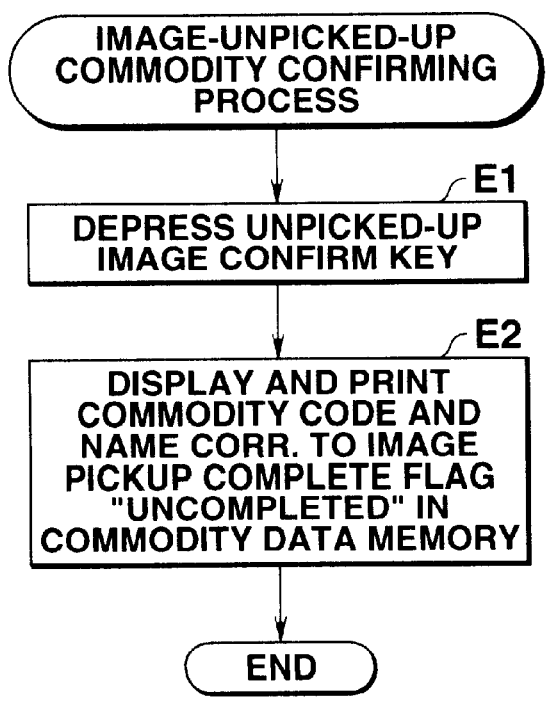
FIG. 33 is a flow chart of a process performed by the commodity image data processor for confirming commodities whose images are not picked up.

The storage device 42 contains a system program in charge of a whole processing operation performed by the commodity image data processor, and control subprograms which are in charge of a learning process of FIG. 27, a commodity examining process of FIG. 28, image pickup/size measuring process of FIGS. 29–32, an unpicked-up image commodity confirming process of FIG. 33, etc. Data on those respective programs are spread in the RAM 41.

Figure 22:
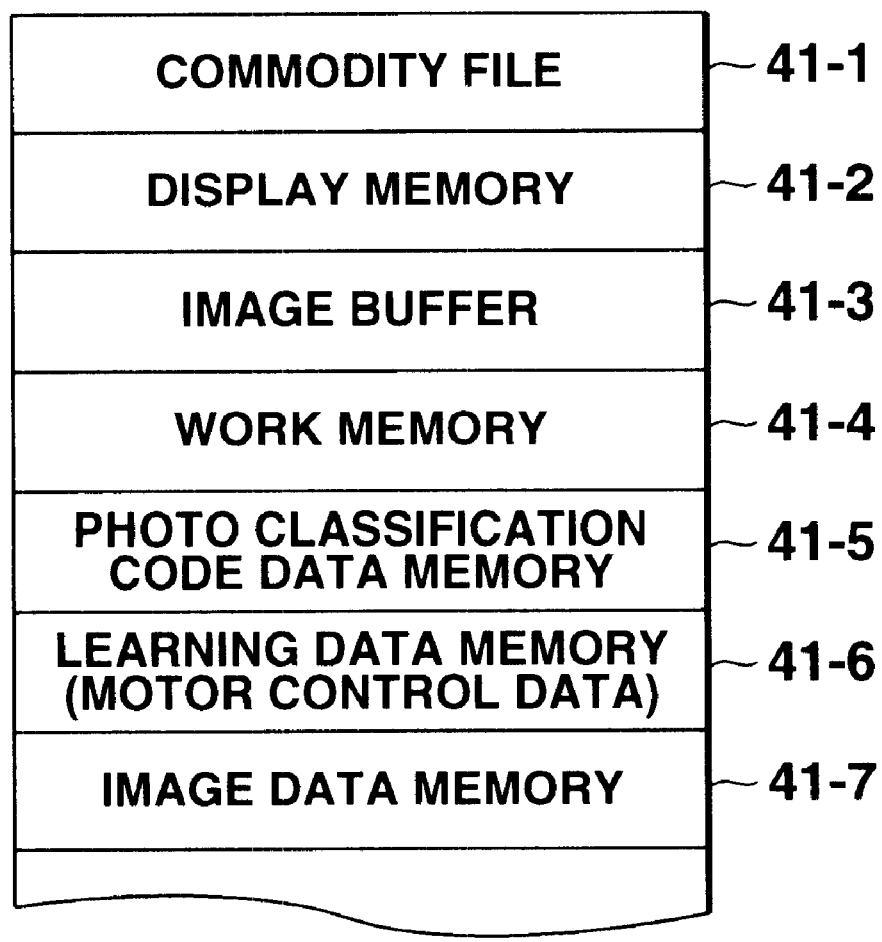
FIG. 22 illustrates a main composition of a RAM of FIG. 20.

FIG. 22 illustrates the main data-memory composition of the RAM 41, which includes a commodity file 41-1, a display memory 41-2, an image buffer 41-3, a work memory 41-4 similar to those of the RAM of the first embodiment, as well as a photo classification code data memory 41-5, a learning data memory 41-6, and an image data memory 41-7.

FIG. 23 illustrates data in the photo classification code data memory 41-5 of the RAM 41 which contains data on a material, hues 1, 2, blurs, content colors 1, 2 of the commodity in a visible range of a container/contents of the commodity and classification code numbers 0, 1, . . . X in corresponding relationship. For example, when the material and hue of a container of a commodity are glass and transparent, respectively, and the colors of the contents of the container are yellow and white, a corresponding photo classification code is "10XX30".

FIG. 24 shows the learning data memory 41-6 of the RAM 41, which stores data, obtained when a professional or expert photographer picks up the image of the commodity in the learning process (FIG. 27), in correspondence to the size (Weight, Height, Depth) and photo classification codes of the commodity. More particularly, the data includes rotational position data X, Y, . . . P sensed at all the rotating mechanisms of the commodity image data processor which include the hinge mechanisms (hereinafter referred to as turning mechanisms) 63, 76–78, and motors provided for other drive mechanisms such as, for example, illumination turning motor M1, camera angle turning motor M2, camera focus adjusting motor M3, iris adjusting motor M4, zoom adjusting motor M5, rotary stage rotating motor M6, and rotary stage lifting motor M7 when the respective images of the front, top, side, etc., of the commodity are picked up.

Figure 25:
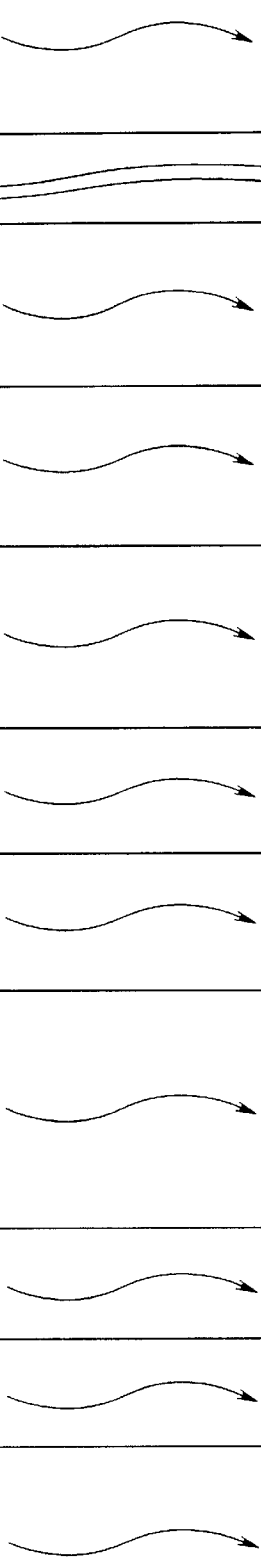
FIG. 25 illustrates the contents of data in a commodity file provided in the RAM.

FIG. 25 shows data in the commodity file 41-1 provided in the RAM 41. The file 41-1 stores a code, name, unit price of an image-pickup commodity input in a commodity examining process (FIG. 28), a size (W, H, D) and weight of the commodity, a photo classification code input in the image pickup/size measuring process (FIGS. 29), memory addresses Nos. of picked-up images, and a pickup complete flag indicating whether all the images of the commodity have been picked up or not.

FIG. 26 shows the contents of data stored in the image data memory 41-7 of the RAM 41. The image data memory 41-7 stores data on the images of the respective faces of each of all commodities picked up in the image pickup process (FIGS. 29–32) and their memory addresses Nos. in corresponding relationship.

The operation of the commodity image data processor will be described with the reference to FIG. 27 which is a flow chart of a learning process performed in the commodity image data processor. In the learning process, data on all tilts of the turning elements of the commodity image data processor, and tilts and drive positions of the drive mechanisms, are stored in the learning data memory 41-6 when a professional or expert photographer picks up and stores various best commodity images.

When the camera 4 is ready to pick up an image of commodity placed on the rotary stage 7 within the box 2 and execution of the learning process is instructed at the input device 38, the learning process of FIG. 27 is started up. In response to this operation, the number of column/row pixels of the commodity image picked up by the camera 4, inputted to the controller 35, and displayed on the display unit 36 is obtained by detection of the image edges. The controller 35 then determines whether the number of column/row pixels of the picked-up image is in a range of 80–90% of the whole number of column/row pixels of the pickup image (step SA1).

When the controller 35 determines that the percentage of the number of column/row pixels of the image to the whole number of column/row pixels of the picked-up image is less than 80%, or larger than 90%, the controller 35 instructs the zoom adjusting motor of the camera 4 to zoom in or out to adjust the percentage of the number of column/row pixels of the image so as to be in a range of 80–90% (step SA1→SA2).

Whether or not the commodity placed on the rotary stage 7 is small, for example, like a screw or otherwise large, for example, like a dog food, the percentage in area of the commodity image occupied in the whole picked-up image is adjusted to the fixed most appropriated one (80–90%), whereupon a message which urges the operator to adjust the focus, iris, and image pickup angle of the camera 4, the rotated and elevated position of the rotary stage 7, the turning position of the illumining device 25, and the turning position of the back plate 33 is displayed on the display unit 36 (step SA1→SA3).

By viewing the commodity image displayed on the display unit 36, the operator keys in command signals at the input device 38 and send them to the respective rotating and driving mechanisms of the commodity image data processor which includes the illumination turning motor M1 of the turning mechanism 75 of the illumining device, the camera angel turning motor M2 of the camera tilting mechanism (hereinafter refers to as the turning mechanism) 63, camera focus adjusting motor M3, and iris adjusting motor M4 of the camera, the stage rotating motor M6, stage lifting/lowering motor M7, etc., to adjust those respective elements to thereby provide the most appropriate image pickup state (steps SA3→SA4→SA3). When it is confirmed that the most appropriate image pickup state is obtained in a state where the shutter key has been operated to fix and display a picked-up image, and then the enter key of the input device 38 is operated (step SA5→SA6), the rotational position data X, Y, ... of the motors M1, M2, ... sensed and inputted from the control systems of the respective turning and driving mechanisms are stored in the learning data memory 41-6 (FIG. 24) of the RAM 41 (step SA6→SA7)

In this case, when the rotary stage 7 is at its initial rotational position and the angle of the camera 4 is at a front-image pickup position, this-position data is stored as motor position data for front image pickup in the learning data memory 41-6; when the angle of the camera 4 is at a top-image pickup position, this-position data is stored as motor position data for top image pickup; when the rotary stage 7 is rotated 90 degrees from its initial position, this-position data is stored as motor position data for side face image pickup; and when the rotary stage 7 is rotated 180 degrees from its initial position, this-position data is stored as motor position data for back image pickup (step SA7).

When data on the size (W, H, D) of the commodity for which data on the rotational positions of the respective turning and driving mechanisms are stored as learning data are input by the input device 38, they are stored in correspondence to data on the turning positions of the respective turning mechanisms stored in the learning data memory 41-6 (step SA8).

When six figures of a photo classification code which represent the classifications of the container and its contents of the commodity learned this time are input in accordance with photo classification code data read from the photo classification code data memory 41-5 (FIG. 23) in the RAM 41 and displayed on the display unit 36, the six figures are then stored in correspondence to data on the rotational positions of the respective turning mechanisms stored in the learning data memory 41-6 (step SA9).

Thereafter, by iterating the learning process on the respective faces of the same commodity and other various commodities, data on rotating and driving positions of the respective turning and driving mechanisms to reproduce the optimal image pickup states of the respective faces of each of commodities are stored in correspondence to the size and photo classification code of that commodity in the learning data memory 41-6c.

FIG. 28 is a flow chart of a commodity examining process performed by the commodity image data processor. In this commodity examining process, codes of all kinds of commodities to be managed are input sequentially in the form of a bar code in correspondence to their names and unit prices to produce an index of those commodities, whose images are picked up, in the commodity file 41-1 (FIG. 25) of the RAM 41.

When a bar code applied to a container of a commodity to be managed is read by the hand scanner 39 and inputted, the controller 35 determines whether the input bar code data is already present as management data in the commodity file 41-1 (step A1, A2).

When the controller 35 determines that the input bar code is a new one and not the one which is already present in the commodity file 41-1 as management data, the new bar code is stored as a commodity code, which is then stored along with the name and unit price of the commodity input by the input device 38 in corresponding relationship in the commodity file 41-1 (step A2→A3)

In the state where bar codes of new commodities are sequentially input, the processing at steps A1–A4 is iterated, data on the code, name and unit price of each commodity are stored in corresponding relationship in the commodity file 41-1.

When the controller 35 determines at step A1 that the bar code input by the hand scanner 39 is already present in the commodity file 41-1, data on a commodity image corresponding to the already present bar code is read out from the image data memory 41-7 (FIG. 26) on the basis of a memory address of the commodity image stored in corresponding relationship to the commodity code, and then displayed on the display unit 36 (step A2→A5).

When the image of the commodity whose bar code is input at step A1 is different from that of the commodity of the same commodity code already stored in the commodity file 41-1, for example, because of change of its container, the controller 35 can determine that the images of the commodity whose bar code is input at step A1 should again be picked up. In this case, if the input device 38 instructs the controller 35 to again pick up the image of that commodity, the corresponding image pickup complete flag in the commodity file 41-1 is reset from "completed" to "uncompleted" (step A6→A7)

When the input device 38 specifies that no image pickup is required, for example, because of wrong commodity examination, a process for inputting a bar code of a commodity to be next examined is performed (step A8→A4→A1)

When the processing at any one of steps A1–A8 is iterated each time a bar code of each commodity is input, and the examining process for all the commodities is completed, the "Enter" key of the input device 38 is operated to complete the whole commodity examining processes to thereby produce a commodity index including the codes, names and unit prices of all the commodities in the commodity file 41-1.

Figure 29:
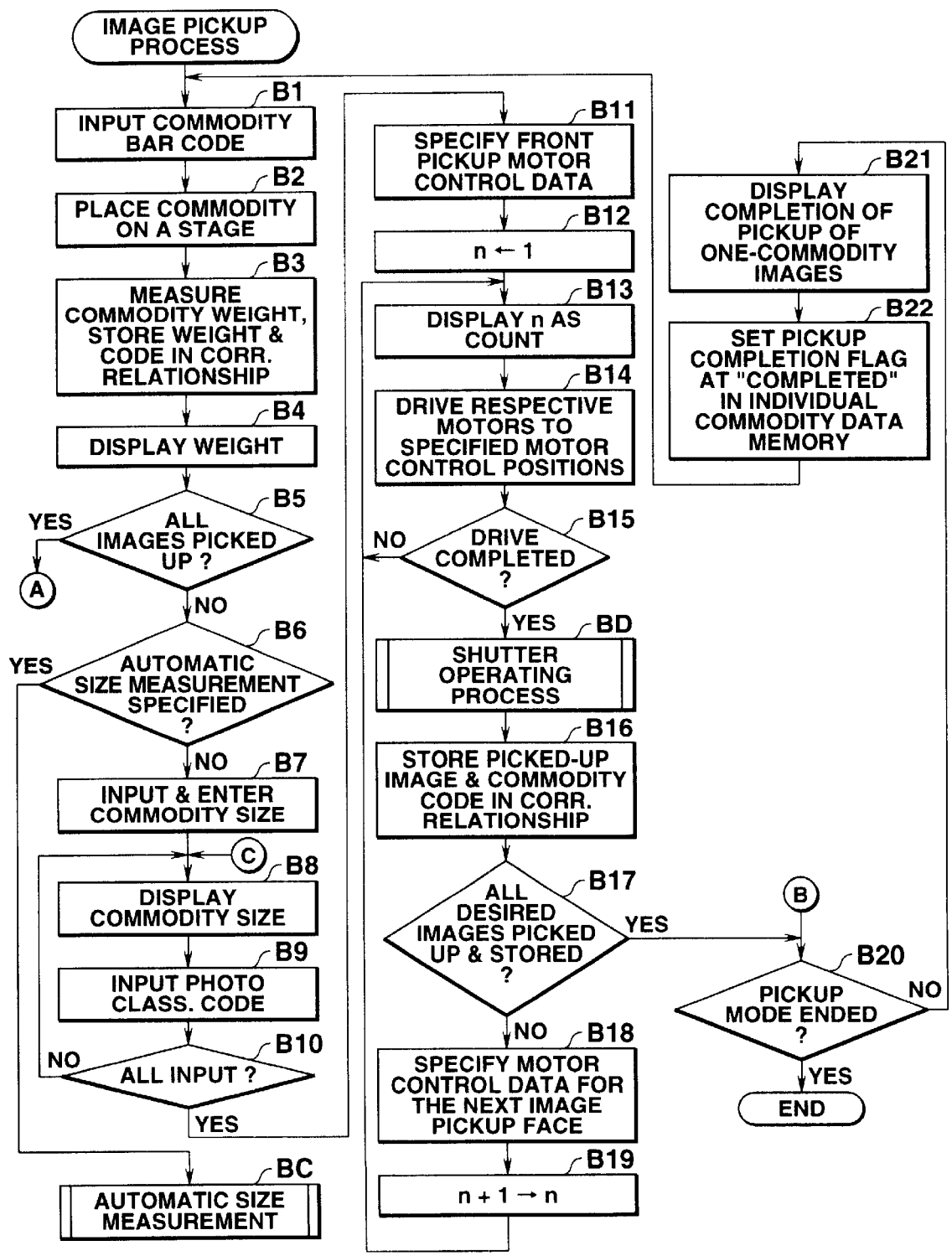
FIG. 29 is a flow chart of a commodity image picking-up process performed by the commodity image data processor.

FIG. 29 is a flow chart of a commodity image picking-up process performed by the commodity image data processor.

Figure 30:
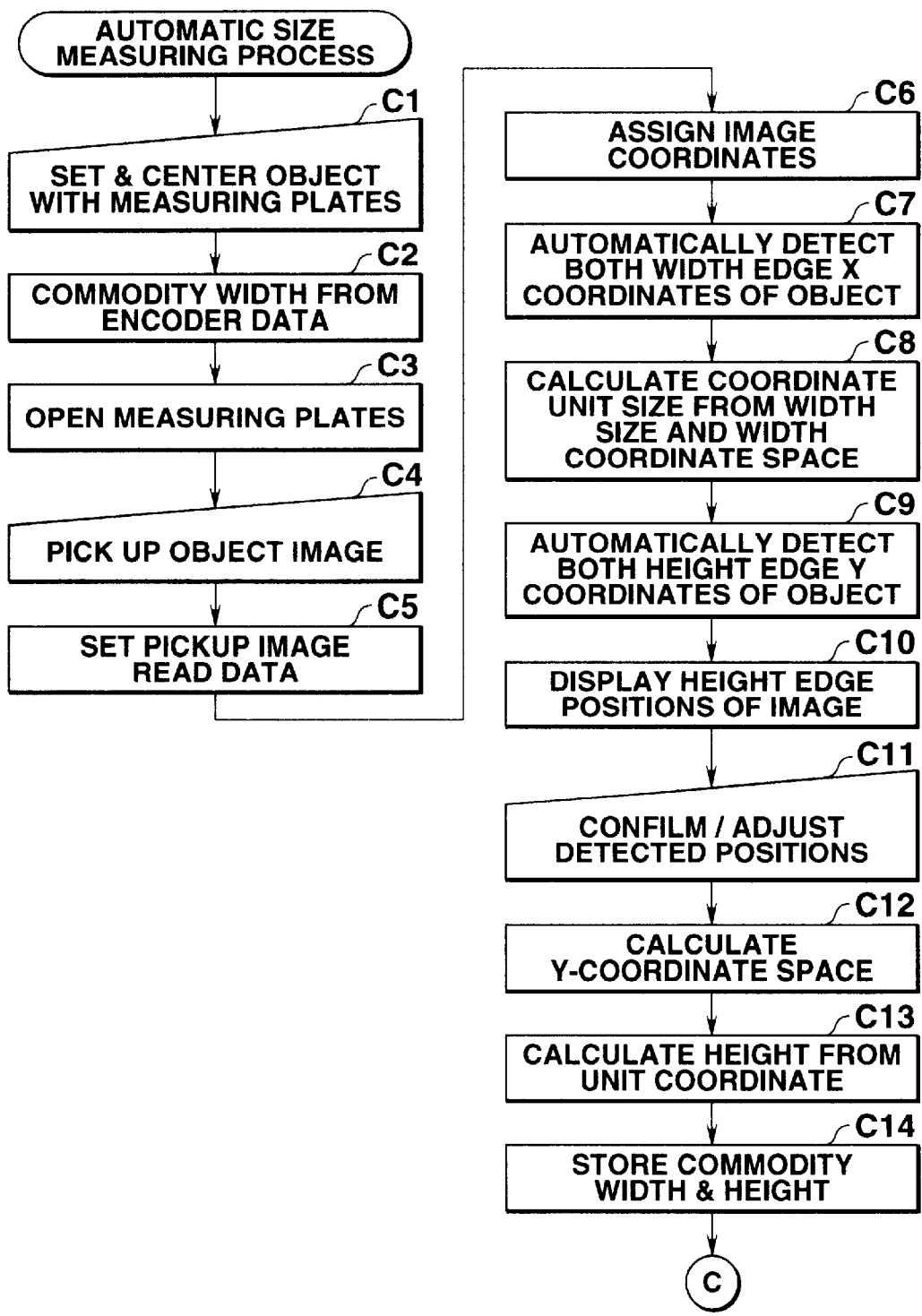
FIG. 30 is a flow chart of an automatic size measuring processes involved in the image pickup process performed by the commodity image data processor.

FIG. 30 is a flow chart of an automatic size measuring processes involved in the image pickup process performed by the commodity image data processor. FIG. 31 is a flow chart of a shutter operating process involved in the image pickup process of FIG. 29. FIG. 32 is a flow chart of a post-image pickup processes involved in the image pickup process.

When (1) the examining process of FIG. 28 is completed, (2) a bar code of a commodity whose images are to be picked up is read out by the hand scanner 39, and the commodity is then placed on the rotary stage 7 within the box 2, the weight of the commodity is measured by the piezoelectric sensor 169 attached to the back of the rotary stage 7, and resulting measured weight data is transferred to the controller 35 and then stored in correspondence to the already bar-code input commodity code in the commodity file 41-1 of the RAM 41 (steps B1, B2, B3). Simultaneously, data on the measured commodity weight is displayed on the display units 20 and 21 within the box 2 (step B4).

The controller 35 determines whether or not the images of the commodity are already picked up, depending on whether the image pickup complete flag corresponding to the appropriate commodity code stored in the commodity file 41-1 represents "completed" or "uncompleted". Thus, when the controller 35 determines that the image pickup complete flag represents "uncompleted" or that the whole image pickup has not been completed, a message which urges the user to specify whether automatic size measurement should be performed is displayed on the display unit 36 (step B5→B6).

In this case, when data on the size (W, H, D) of the commodity of interest is manually input by the input device 38 without specifying the automatic size measurement, the input size data is entered in correspondence to the appropriate commodity code in the commodity file 41-1 and displayed on the display units 20 and 21 within the box 2 (step B6→B7, B8).

When the user specifies the automatic size measurement of the commodity at step B6, the controller 35 shifts its control to the automatic size measurement process of FIG. 30 (step B6→BC)

In this case, the size measurement device 90 (FIG. 19) is already set on the rotary stage 7 within the box 2, and the commodity of interest whose bar code is input at step B1 is placed on the size measuring base 92.

When the automatic size measurement process starts, first, the size measuring motor (not shown) is driven, the size measuring plates 94R and 94L are moved toward each other in the direction of arrows h1 and h2 from the opposite ends of the size measuring window 93, and the commodity (object) is pinched on its both sides by the size measuring plates 94R and 94L and placed on the center of the size measuring base 92 (step C1).

In response to this operation, the controller 35 calculates the width W of the commodity 1 on the basis of data on the measured distance, through which the size measuring plates 94R and 94L have slid, and transferred from the encoder 98 to the controller 35 (step C2). Thereafter, the size measuring plates 94R and 94L are moved away from each other as shown by arrows i1 and i2 and reset again at the opposite ends of the window 93 (step C3).

The image of the commodity 1 set at the center of the size measuring base 92 is then picked up by the camera 4, and its image data is read by the controller 35, written into the image buffer 41-3 of the RAM 41, and also displayed on the display unit 36 (steps C4, C5).

In response to this operation, a XY coordinate system is allocated to the image of the commodity (object) 1 written into the image buffer 41-3, and X coordinates (Xstart, Xend) corresponding to both edges of the width of the commodity image are detected (step C6, C7).

The controller 35 then divides the width W of the commodity 1 obtained at step C2 by the number of X coordinates corresponding to the width W of the commodity image obtained at step C7 to calculate a size or dimension per unit coordinate (step C8).

Then, the Y coordinates (Ystart, Yend) corresponding to both the edges of the height of the commodity image are detected and the detected positions of the edges of the height of the commodity image are displayed on the display unit 36 by a pointer (steps C9, C10).

When the detected height edges of the commodity image displayed by the pointer on the displayed unit 36 do not coincide with the height edges of the displayed commodity image, the pointer position is moved appropriately in the vertical direction by the key operation for correcting the edge detection positions in the height direction (step C11).

Then, the dimension per unit coordinate calculated at step C8 is multiplied by the number of Y coordinates corresponding to the distance between the height edge pointers detected, corrected and displayed at steps C9–C11 to provide the height H of the commodity (steps C12, C13).

In response to this operation, data on the width W of the commodity obtained at step C2 and data on the height H of the commodity obtained at step C13 are entered in correspondence to the appropriate commodity codes in the commodity file 41-1 (step C14).

The data on the size of the commodity entered in the commodity file 41-1 in the automatic size measuring process is then displayed on the display units 20 and 21 within the box 2 (step BC→B8)

Then, a 6-figure photo classification code representing classifications of the container and contents of the commodity 1 is input in accordance with the photo classification code data read from the photo classification code data memory 41-5 (FIG. 23) of the RAM 41 and displayed on the display unit 36, and then entered in the commodity file 41-1 (step B9).

Then, the photo classification code stored in the learning data memory 41-6 coinciding with, or closest to, the entered photo classification code is retrieved, and rotating position control data for the respective motors M1, M2 . . . in the front image pickup and corresponding to the appropriate photo classification code are read out (step B10→B11).

In response to this operation, "1" is set in the image counter memory n provided in the work memory 41-4 of the RAM 41, and displayed as representing the number of images picked up on the display units 20, 21 within the box 2 (steps B12, B13).

In accordance with the rotational position control data X1, Y1, . . . for the respective motors M1, M2, . . . , M7 of the turning and driving mechanisms in the front image pickup read out in accordance with the photo classification code of the commodity 1 from the learning data memory 41-6, those motors are rotated/controlled to provide an optimal image pickup condition for the front image pickup of the commodity 1.

In response to this operation, the controller shifts its control to a shutter operating process of FIG. 31 (steps B14, B15→BD). In this process, first, the user determines, in the state where the turning and driving mechanisms are controlled in accordance with the learning data of the above-mentioned photo classification code, whether the front image of the commodity 1 picked up by the camera 4, transferred to the controller 35, and displayed on the display 36, is in a best monitored state (step D1).

If not, the user finely adjusts the motors of the appropriate turning and driving mechanisms for the illumining device 25, camera 4 and rotary stage 7, etc., to change the image pickup state of the front image of the commodity to a better one. In response to this operation, the controller 35 determines whether this adjustment is a first one of the image pickup state of the commodity whose image is to be picked up this time. If so, the controller 35 ensures an entry area for new learning data in an empty area of the learning data memory 41-6 of the RAM 41 (step D1→D2, D3→D4).

Data on the rotating and driving positions of the turning and driving mechanisms after the adjustment are stored in the ensured entry area of the learning data memory 41-6 (step D5) Thereafter, when adjustments of the turning and driving mechanism for the same commodity are performed successively, no new learning data entry area is ensured in the learning data memory 41-6, and rotating and driving position data on the turning and driving mechanisms obtained after their first-time fine adjustment for the commodity 1 are sequentially entered in the corresponding areas of the learning data entry area ensured in the first-time fine adjustment of the turning and driving mechanism (step D2→D3→D5)

When motor position control data M1, M2, . . . optimal for the turning and driving mechanisms and different from the leaning data already present in the leaning data memory 41-6 are obtained in the actual image pickup, those data are entered additionally as new learning data in the leaning data memory 41-6 (steps D1–D5).

When the user determines that the monitored state of the front image of the commodity 1 is a best one and operates the shutter key of the input unit 38, data on the picked-up front image of the commodity at a time when the camera shutter is operated is stored in the image buffer 41-3 and displayed unchanged on the display unit 36 (step D1→D6).

In response to this operation, the controller 35 determines whether the automatic size measuring process (step BC) based on its specifying operation at step B6 has been performed or whether the size measuring base 91 has been used. If so, image data corresponding to the size measuring base 91 is replaced with a corresponding portion of the background image data among an image involving the front image of the commodity 1 picked up by the camera and displayed on the display unit 36 (step D7→D8)

When the image of the commodity 1 picked up this time relates to its top face, the obtained image is inverted. That is, an inverted image of the top image obtained by reflection of the mirror 31 is further inverted to return to a normal top image (step D9→D10)

When the shutter operating process involving the pickup of the front image of the commodity is terminated in this way, the picked-up front image data stored in the image buffer 41-3 is stored in the image data memory 41-7 and its address (No.) is stored in correspondence to the bar code-input commodity code in the commodity file 41-1 (step BD→B16).

In response to this operation, the user then determines whether the required images of all the faces of the commodity 1 are stored depending on the number of picked up images displayed on the display units 20, 21. When in this case the user determines that the image of the top, side and/or back of the commodity 1 are further required to be picked up and depresses the "N" key of the input unit 38, rotating and driving position control data for the respective motors M1, M2, . . . placed in the correspondence to the appropriate photo classification codes stored in the learning data memory 41-6 when the next face image, that is, top image, of the commodity is picked up are read out (step B17→B18).

In response to this operation, the count in the image counter memory n provided in the work memory 41-4 of the RAM 41 is incremented by one to become "2", which is displayed on the display units 20, 21 within the box 2 (step B19→B13)

Thereafter, when the respective motors M1, M2, M3, . . . M7 of the turning and driving mechanisms are rotated and driven on the basis of the rotating and driving position control data X2, Y2, . . . in the top image pickup read out in accordance with the photo classification code of the commodity 1 from the leaning data memory 41-6, and set in a state optimal for pickup of the front image of the commodity 1, the controller 35 again shifts its control to the shutter operating process of FIG. 1 (steps B14, B15→BD).

When the shutter operation involved in the pickup of the top image of the commodity is terminated after processing at steps D1–D10 of FIG. 31, the top image data is stored in the image data memory 41-7 of RAM 41 and its address (No.) in the image data memory 41-7 is stored in correspondence to the bar-code inputted commodity code in the commodity file 41-1 4 (step BD→B16)

Thereafter, when counting up and displaying the number of picked-up images of the commodity, optimal motor rotation and driving position control based on the learned data, and storing the picked-up image in the shutter operation at steps B17–B19→B13–B16 are further iterated sequentially for pickup of images of other faces of the commodity. When the controller 35 determines at step B17 that all necessary picked-up face images of the commodity 1 have been stored, and the user depresses the "Y" key of the input unit 38, a message which urges the user to determine whether the image pickup mode should be terminated is displayed on the display unit 36 (step B17→B20).

When the face images of the next commodity are required to be picked up and the image pickup mode should not be terminated, the "N" key of the input unit 38 is depressed. In this case, a message which indicates that all the predetermined face images of the previous commodity 1 have been stored is displayed on the display unit 36, and an image pickup complete flag corresponding to the appropriate commodity code in the commodity file 41-1 is set at "completed" (step B20→B21, B22).

In response to this operation, the controller returns its control to the bar code inputting step of the image pickup process for the next commodity starting at step B1. Then, as in the process mentioned above, production of commodity management data in the commodity file 41-1 by measuring the weight and size of the commodity 1 and picking up and storing the most appropriate face images of the commodity is iterated (steps B1–B22).

When the controller 35 then determines at step B1 that the image-pickup complete flag in the commodity file 41-4 corresponding to the bar-code input commodity code of the commodity whose image is then to be picked up is already set at "completed" and that the commodity is the one whose management data is already created, the controller shifts its control to the post image-pickup process of FIG. 32, wherein a message which indicates that the commodity 1 is the one whose image has already picked up is displayed on the display unit 36 (step B5→B23)

Thereafter, unnecessary data stored in the work memory 41-4, etc., of the RAM 41 are cleared and preparations for pickup of a face image of the next commodity 1 are made. Then, the controller 35 again returns to its control to the next-commodity bar code inputting step (step B1) of the image pickup process. As in the process mentioned above, production of commodity management data in the commodity file 41-1 by measuring and storing the weight and size of the commodity and storing its appropriate face images is iterated (step B24→B1–B22).

When production of the commodity management data on all the commodities is completed, a message which urges the user to determine whether the image pickup mode should be terminated is displayed on the display unit 36 at step B20. When the user depresses the "Y" key of the input unit 38 by viewing the message, the image pickup process is terminated (step B20→END).

FIG. 33 is a flow chart of a process for confirming a commodity whose images have not yet been picked up. When a predetermined function key of the input unit 38 is depressed to confirm whether there is any commodity whose images have not yet been picked up, after production of commodity management data for each of the commodities in the commodity file 41-1 based on the image pickup process of FIGS. 29–32, the codes and names of the commodities for which the image pickup complete flags are set at "uncompleted" in the commodity file 41-1 are retrieved, indicated on the display unit 36, and printed out by the printer 44 to be reported to the operator (steps E1, E2).

Thus, the weights and sizes of all the commodities whose management data are required to be produced are measured and their images are picked up, and those data are produced as commodity management data and managed in the commodity file 41-1.

Thus, according to this commodity image data processor, the code of the commodity 1 is input in the form of a bar code by the hand scanner 39 connected to the controller (personal computer) 35. The face image of the commodity placed on the rotary stage 7 within the box 2 for which the image pickup conditions of the illumining angle, commodity placement, image pickup focus, iris, zoom, angle and shutters are controlled in accordance with instructions from the controller 35 is picked up by the camera 4 and resulting commodity image data is delilvered to the controller 35. In response to this operation, data on the picked-up face image of the commodity 1 is stored in the image data memory 41-7 of the RAM 41, and an address in the image data memory 41-7 at which the image data of the commodity is stored is stored in correspondence to the bar code-input commodity code in the commodity file 41-4. Thus, only by iterating input of the codes of various commodities in bar codes and pickup of the images of the commodities, commodity management data in which the commodity image data correspond to the commodity codes is easily produced.

According to the commodity image data processor, when photo classification codes representing the features of the containers and contents of various commodities 1 are input by the input device 38 of the controller 35, the respective commodities are placed on the rotary stage 7 within the box 2. In accordance with instructions from the controller 35, the image pickup conditions which include the illumining angle of the illumining device 25, the position of each commodity placed on the rotary stage 7, and the focus, iris, zoom, angle, etc., of the camera are set at their optimal values. In response to this operation, control position data which set the respective image pickup conditions are sensed and stored in correspondence to the input photo classification code in the learning data memory 41-6 of the RAM 41. When actual commodity management data are created, the code of the commodity 1 is input in the form of a bar code by the hand scanner 39 and the commodity is placed on the rotary stage 7 within the box 2. When the photo classification code of the commodity is then input, the respective image pickup conditions which include the illumining angle of the illumining device 25, the position of the commodity placed on the rotary stage 7, and the focus, iris, zoom and angle, etc., of the camera 4 are set at respective optimal values in accordance with control data for the respective image pickup conditions stored in the learning data memory 4-6 in correspondence to the input photo classification code. The face image of the commodity is then picked up and corresponding face image data is stored and managed in correspondence to the bar code-input commodity code in the commodity file 41-1. Thus, only by iterating input of the codes of various commodities in bar codes and pickup of the images of the commodities, any body can rapidly and well pick up the face images of the commodity and easily produce commodity management data in which the commodity image data correspond to the commodity codes.

According to this commodity image data processor, before commodity management data are produced by picking up the images of the commodities, the codes of all the respective commodities are input sequentially in the form of a bar code by the hand scanner 39 to create a commodity index of the commodities for which the commodity management data are produced in the commodity file 41-1. Thereafter, when the picked-up image data obtained by picking up the image of the commodity is entered in correspondence to the commodity code in the commodity file 41-1, the image pickup complete flag is changed from "uncompleted" to "completed". This serves to easily retrieve a commodity 1 whose images have not yet been picked up. Thus, commodity management data on all the commodities whose codes are input in bar codes are all produced and recorded without omission.

According to this commodity image data processor, the top image of the commodity 1 placed on the rotary stage 7 and reflected by the mirror plate 31 attached to the ceiling of the box 2 is picked up by the camera set on the top image pickup angle. The reflected picked-up top image is further inverted, temporarily stored in memory, and then permanently stored in the image memory 41-3. Thus, even when the image of the commodity is picked up, using reflection of the mirror plates 31, storage of the inverted picked-up image is prevented.

According to this commodity image data processor, when the image pickup conditions of the commodity 1 are set at corresponding optimal values in accordance with control position data of the respective image pickup conditions corresponding to the photo classification code of the commodity 1 stored in the leaning data memory 41-6, the control position data on the respective image pickup conditions can be adjusted finely. In this case, the resulting control position data are entered as new image pickup conditions in an empty area of the learning data memory 41-6. Thus, even in the actual image pickup process, new learning data different from that present already in the learning data memory 41-6 can be additionally stored in the learning data memory 41-6.

According to this inventive commodity image processor, the weight of the commodity is measured by the piezoelectric sensor 16 attached to the back of the rotary stage 7 and resulting weight data is delivered to the controller 35. The width W of the commodity 1 is measured by the size measuring device 90 united to the rotary stage 7 as the image pickup position of the commodity 1 is centered. The height H of the commodity 1 is then calculated based on the measured commodity width W and the aspect ratio of the image obtained from the picked-up image of the commodity, and data on the height H of the commodity is then delivered to the controller 35. This height data is stored in correspondence to its related bar code-input commodity code and its picked-up image data in the commodity file 41-1. Thus, without inputting data on the weight and size of the commodity manually, the weight and size of the commodity is entered along with the picked-up commodity image as commodity management data.

While in the particular embodiment the mechanism which centers the commodity 1 on the rotary stage 7 is illustrated as achieved by performing an automatic size measuring process using the size measuring device 90, the image pickup position on the rotary stage 7 may be centered, using a centering mechanism of FIGS. 34A and B or 35A and B.

FIG. 34A is a perspective view of another or second commodity centering mechanism usable in the commodity image data processor, and FIG. 34B shows on a reduced scale the centering of a commodity 1 in a cross-sectional view as viewed in the direction of arrow A.

The second commodity centering mechanism takes the form of a bowl composed of four openable sections 102a–102d provided at the center of a centering base plate 107 integral with the rotary stage 7. The respective sections 102a–102d are opened outward, as shown by arrows k1–k4, a commodity 1 is inserted within the opened sections in a direction of arrow m, those sections are then raised up so as to pinch the commodity equally on their sides and hence the commodity is centered within the bowl.

FIG. 35A is a perspective view of still another or a third commodity centering mechanism usable in the commodity image data processor, and FIG. 35B shows the centering of a commodity 1 in a cross-sectional view, using this centering-mechanism.

The third commodity centering mechanism includes three sideway pushing rods 103a–103c provided at equally spaced positions close to the outer periphery of the rotary stage 7 on the bottom of the box 2 so that they turn toward the center of the rotary stage 7 simultaneously in the directions of arrows n1–n3. When the commodity 1 is placed at any desired position on the rotary stage 7, the pushing rods 103a–103c are then turned to push the commodity equally toward the center of the rotary stage 7.

The third commodity centering mechanism may include an encodered automatic size measuring and centering mechanism which pushes the commodity simultaneously with pushing plates on the rotary stage 7 in four side directions. When an image of the commodity is picked up, the pushing plate placed on the image pickup side of the camera should be pushed sidelong so as not to hinder the image pickup operation.

Figure 36A:
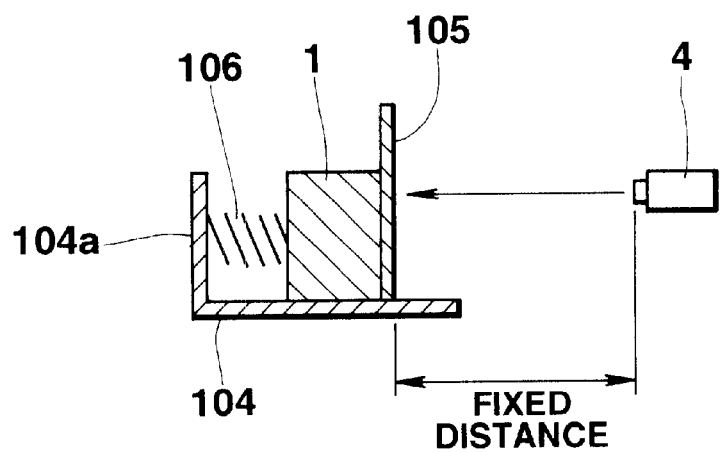
FIG. 36A is a side cross-sectional view of a commodity fixing mechanism of the commodity image data processor.

While in the embodiment the front and top images of the commodity 1 disposed on the rotary stage 7 are illustrated as obtained by sequentially repeating the same image pickup operation twice and stored as separate image data, the top and front images may be simultaneously picked up and stored, using a pickup commodity fixing mechanism of FIGS. 36A and B.

Figure 36B:
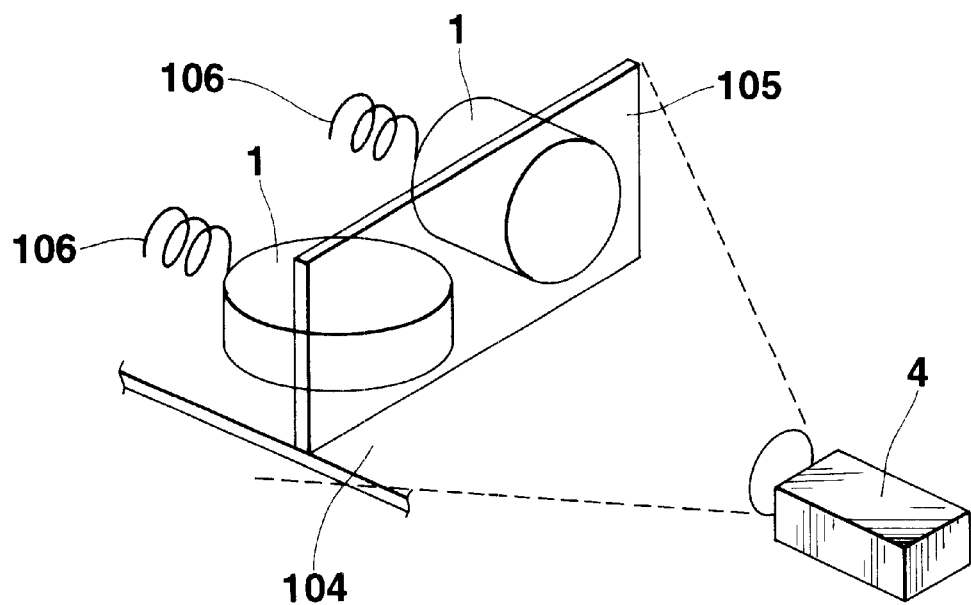
FIG. 36B is a perspective view of the commodity fixing mechanism placed in an image pickup state.

FIG. 36A is a cross-sectional view of the commodity fixing mechanism, and FIG. 36B is an enlarged perspective view of the commodity fixing mechanism.

More specifically, the commodity fixing mechanism includes an L-like stage plate 104 disposed integrally on a rotary base (not shown) such as is shown by 107 in FIG. 34A and a front upstanding transparent plate 105 provided parallel to an upstanding branch plate portion of the L-like stage plate 104 acting as back plate 104a with a gap large enough to receive two commodities in parallel between the back plate 104a and the transparent plate 105, and a pair of parallel commodity push springs 106 provided between the back plate 104a and the front transparent plate 105 with the pair of spaced commodity push springs 106 being connected at one end to the back plate 104a. In use, two commodities 1 of different size or the same size are put between the front and back plates 105 and 104a so that the front of one of the commodities is brought by a corresponding push spring 106 into contact with the front plate 105 and the top of the other commodity is brought by the other push spring 106 into contact with the front plate. Thus, the focal distance of the camera 4 is adjusted by the position of the transparent plate 105, and the top and front images of the commodity 1 can be picked up simultaneously.

As described above, in the particular embodiment the commodity 1 placed on the base 92 of the size measuring device 90 is directly pinched from right and left by the size measuring plates 94R and 94L so that the distances through which the size measuring plates 94R and 94L have moved are measured by the encoder 98 to calculate the width W of the commodity, and the height H of the commodity is calculated based on the commodity width W from the aspect ratio of the commodity image. Alternatively, for example, in the size measuring device 90, a pair of standard marks may be provided each at a respective one of the leading ends of the size measuring plates 94R and 94L the distance between which becomes known, so that the pair of marks are picked up along with the commodity image. In this case, the width W and height H of the commodity can be calculated based on the distance between the pair of standard marks from the aspect ratio of the commodity image.

Alternatively, without using the size measuring device 90, a plurality of equally spaced reference marks whose images are picked up along with the image of the commodity 1 may be provided on the back plate of the box 2. Thus, the width W and height H of the commodity can be calculated based on the distance between two relevant reference marks based on the aspect ratio of the commodity image.

While in the third embodiment the respective control position data for the turning and driving mechanisms corresponding to the optimal image pickup conditions on the side of the box 2 and the respective control position data on the focus, iris and zoom of the camera 4 corresponding to its optimal image pickup conditions are collectively stored in correspondence to the respective commodity photo classification codes, the respective control position data for the camera 4 may be stored in the controller which controls the camera, and desired control position data may be specified by the controller 35 in accordance with a photo classification code input when the image of the commodity is picked up.

While in the third embodiment the photo classification code representing the features of the commodity 1 are illustrated as being keyed in in accordance with table data stored in the photo classification code data memory 41-5 of the RAM 41, the photo classification codes may be produced automatically by color analysis of the picked-up image of the commodity 1.

Figure 10:
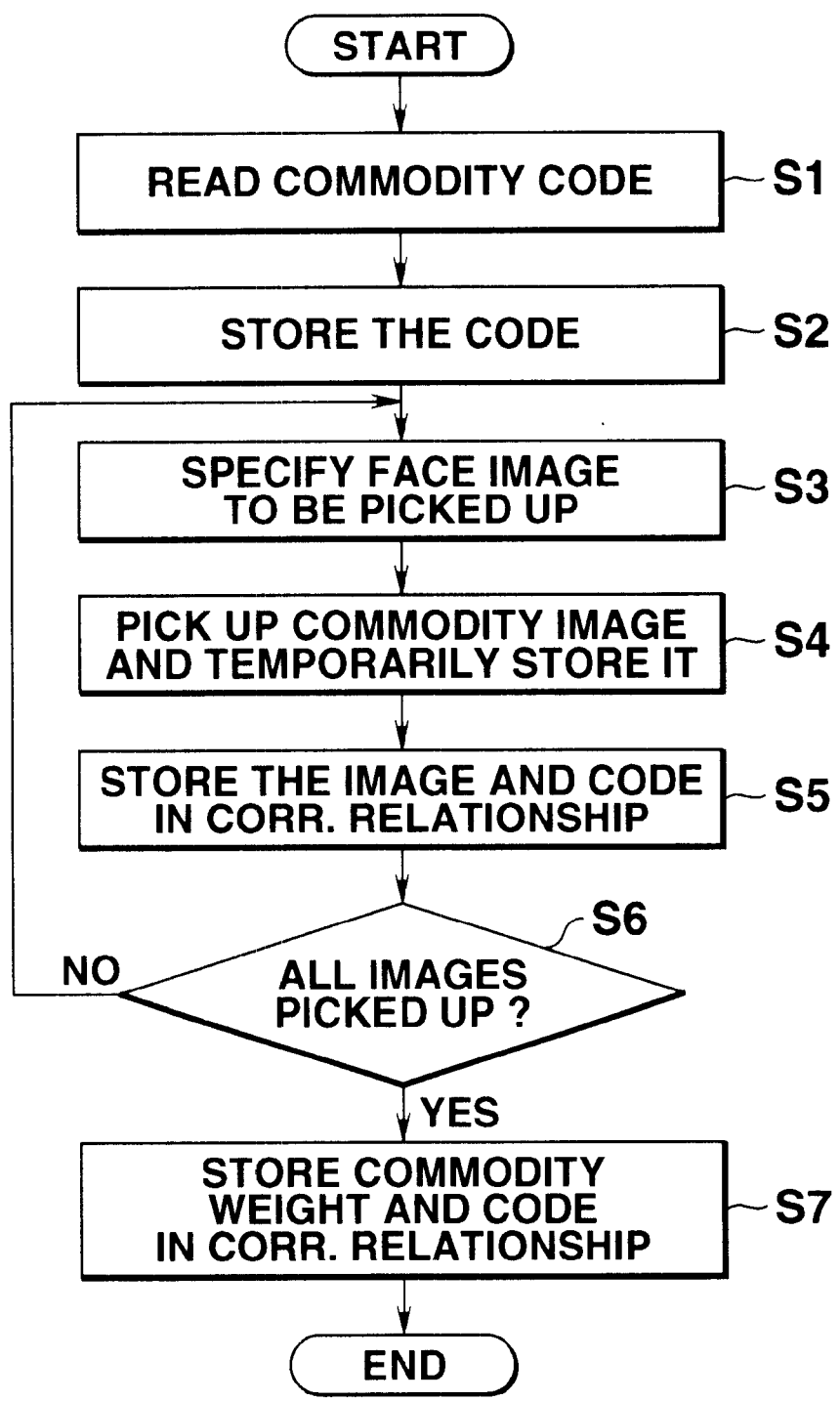
FIG. 10 is a flow chart of a whole operation of the image pickup aiding apparatus of FIG. 1.

Data on the respective processes described in the first and third embodiments, that is, data on the image pickup process of the FIG. 10, the leaning process of FIG. 27, the commodity examining process of FIG. 28, the weight and size measuring/image pickup process of the FIGS. 29–32, the unpicked-up image commodity confirming process of FIG. 33 can be stored and conveyed in the form of a program executable by a computer in an (external) storage medium 43 which includes a memory card (ROM, RAM card), magnetic disk (floppy or hard disk), optical disk (CD ROM, DVD) or semiconductor memory or can be received externally via communications lines. The computer can store programs stored in the storage medium 43 or programs received externally via the communication lines into the storage device 42, and the computer's operation can be controlled by the stored programs to realize the commodity management data creating function described in the particular embodiment and to perform the respective processes above mentioned.

What is claimed is:

1. An image pickup system comprising:
    a box-like body device within which an object whose image to be picked up is placeable; and
    an image pickup device for picking up the image of the object placed within said box-like body device;
    wherein said box-like body device comprises:
        illumining means, provided within said box-like body device, for illuminating the object placed within the box-like body device on a front side of the object from above;
        holding means, provided on said box-like body device, for holding said image pickup device;
        mirror means, including a reflective surface attached obliquely above the object within said box-like body device, for reflecting a top image of the object toward said image pickup device; and
        a mechanism, provided between said image pickup device and said holding means, for: (i) moving said image pickup device to a first position where said image pickup device faces the front side of the object placed within said box-like body device, and causing said holding means to hold said image pickup device at the first position when said image pickup device picks up a front image of the object, and (ii) moving said image pickup device to a second position where said image pickup device faces the reflective surface of said mirror means, and causing said holding means to hold said image pickup device at the second position when said image pickup device picks up the top image of the object.

2. The image pickup system according to claim 1, wherein said box-like body device further comprises moving means for moving the object to a third position.

3. The image pickup system according to claim 2, wherein said moving means comprises means for lowering and lifting the object relative to said image pickup device.

4. The image pickup system according to claim 2, wherein said moving means comprises a rotary stage which rotates with the object when the object is placed on said rotary stage.

5. The image pickup system according to claim 1, wherein said illumining means comprises means for illumining the object with even-intensity plane emission light.

6. The image pickup system according to claim 1, further comprising an image pickup hood provided between said image pickup device and said box-like body device for shielding said image pickup device from external light.

7. The image pickup system according to claim 1, further comprising a display provided within said box-like body device for displaying information relating to at least one of how many images of the object have been picked up, a weight of the object, and a size of the object, wherein said display is disposed at a position such that the displayed information may be picked up by said image pickup device.

8. An image pickup system comprising:
    a box-like body device within which an object whose image to be picked up is placeable;
    an image pickup device for picking up the image of the object placed within said box-like body device; and
    a processor for processing the image of the object picked up by said image pickup device;
    wherein said box-like body device comprises:
        illumining means, provided within said box-like body device, for illuminating the object placed within the box-like body device on a front side of the object from above;
        holding means, provided on said box-like body device, for holding said image pickup device;
        mirror means, including a reflective surface attached obliquely above the object within said box-like body device, for reflecting a top image of the object toward said image pickup device; and
        a mechanism for selectively turning said image pickup means to at least one of a first hold position where said image pickup device faces a front of the object placed within said box-like body device and a second position where said image pickup device faces the reflective surface of said mirror means;
    wherein said processor comprises means for: (i) automatically controlling said mechanism to turn said image pickup device to the first hold position, and causing said holding means to hold said image pickup device at the first position when said image pickup device picks up a front image of the object, and (ii) automatically controlling said mechanism to turn said image pickup device to the second hold position, and causing said holding means to hold said image pickup device at the second position when said image pickup device picks up an image of the object reflected by said mirror means.

9. The image pickup system according to claim 8, further comprises means for storing the front image of the object picked up when said image pickup device is held at the first position, and means for inverting the image of the object picked up when said image pickup device is held at the second position and storing the inverted image as a top image of the object.

* * * * *